(12) United States Patent
Van Der Merwe et al.

(10) Patent No.: US 10,519,382 B2
(45) Date of Patent: Dec. 31, 2019

(54) BITUMEN PRODUCTION WITH SOLVENT SEPARATION FROM TAILINGS USING DISTRIBUTOR CONSTRUCTIONS AND TECHNIQUES

(71) Applicant: FORT HILLS ENERGY L.P., Calgary (CA)

(72) Inventors: Shawn Van Der Merwe, Calgary (CA); Mohammad Shariati, Burnaby (CA); Ali Vakil, Burnaby (CA); Benito Moyls, Burnaby (CA); Bryan Demko, Calgary (CA)

(73) Assignee: FORT HILLS ENERGY L.P., Calgary (CA)

( * ) Notice: Subject to any disclaimer, the term of this patent is extended or adjusted under 35 U.S.C. 154(b) by 218 days.

(21) Appl. No.: 15/638,029

(22) Filed: Jun. 29, 2017

(65) Prior Publication Data

US 2018/0051213 A1    Feb. 22, 2018

(30) Foreign Application Priority Data

Aug. 16, 2016    (CA) .................................... 2939123

(51) Int. Cl.
    *C10G 1/04*    (2006.01)
(52) U.S. Cl.
    CPC .................... *C10G 1/045* (2013.01)
(58) Field of Classification Search
    CPC ...... C10G 1/045; C10G 1/04; C10G 2300/44; C10G 2300/4081
    See application file for complete search history.

(56) References Cited

U.S. PATENT DOCUMENTS

| 4,492,562 | A | 1/1985 | Michel |
| 4,950,363 | A | 8/1990 | Silvey |
| 6,622,947 | B1 | 9/2003 | Rivera |
| 8,197,676 | B2 | 6/2012 | Kan |

(Continued)

FOREIGN PATENT DOCUMENTS

| CA | 2272045 | * 11/2000 |
| CA | 2272045 C | 11/2000 |

(Continued)

OTHER PUBLICATIONS

Saeid Rahimi, "Three Phase Separators—Inlet Devices", Chemwork, Jan. 28, 2013, http//www.chemwork.org, 9 pages.

*Primary Examiner* — Randy Boyer
*Assistant Examiner* — Juan C Valencia
(74) *Attorney, Agent, or Firm* — Marshall, Gerstein & Borun LLP

(57) ABSTRACT

Production of bitumen from bitumen froth can include separating the froth into a solvent diluted tailings and solvent diluted bitumen, and then the diluted tailings can be treated to recover solvent for reuse in the froth separation. The solvent recovery from tailings can employ a distributor for use in a tailings solvent recovery unit (TSRU). The distributor can include slot-shaped pressure let-down apertures and a closed curved end portion to introduce the tailings into a separation vessel. The distributor construction can have various advantages, such as facilitating manufacturing as well as effective mitigation of pre-flashing and solids segregation issues, for enhanced bitumen production and solvent recovery operations.

26 Claims, 14 Drawing Sheets

(56) References Cited

U.S. PATENT DOCUMENTS

| | | | |
|---|---|---|---|
| 8,591,724 B2 * | 11/2013 | Sutton | C10G 1/045 |
| | | | 208/45 |
| 8,741,107 B2 | 6/2014 | Kan | |
| 8,770,497 B2 | 7/2014 | Cartage et al. | |
| 2011/0056664 A1 | 3/2011 | De Larminat et al. | |

FOREIGN PATENT DOCUMENTS

| CA | 2616036 C | 6/2009 |
|---|---|---|
| CA | 2738700 C | 10/2012 |

* cited by examiner

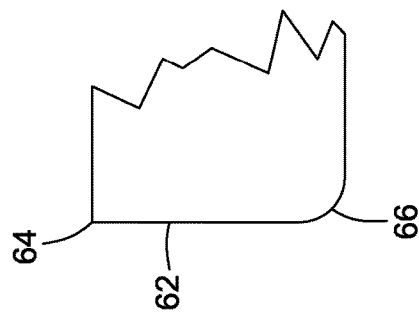
Fig. 14
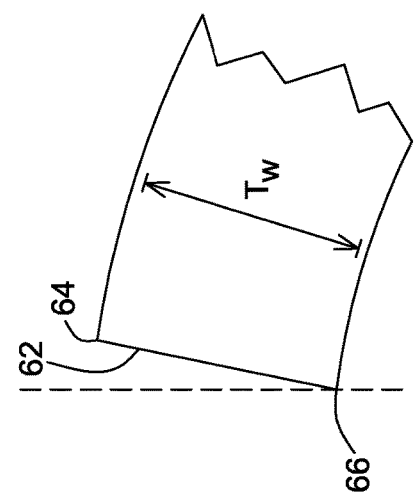
Fig. 13
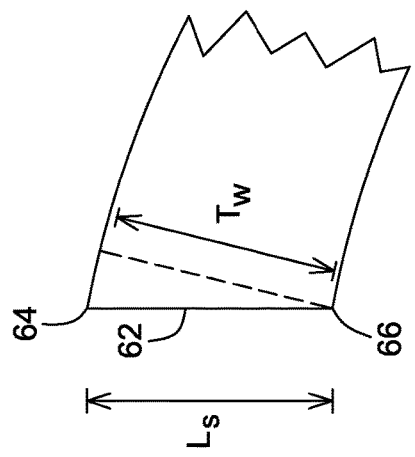
Fig. 12
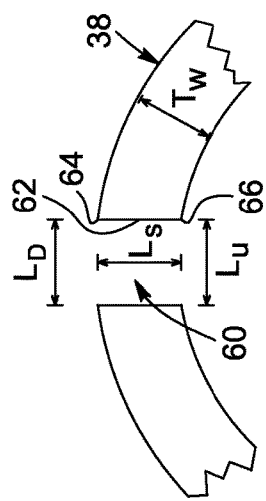

BITUMEN PRODUCTION WITH SOLVENT SEPARATION FROM TAILINGS USING DISTRIBUTOR CONSTRUCTIONS AND TECHNIQUES

TECHNICAL FIELD

The technical field generally relates to techniques for producing bitumen wherein the process includes solvent addition to bitumen froth to produce solvent diluted bitumen and solvent diluted tailings, which is introduced and distributed into a flash vessel of a tailings solvent recovery unit (TSRU) that is part of the overall bitumen froth treatment operation.

BACKGROUND

Recovering solvent from solvent diluted tailings has various challenges. Solvent diluted tailings are often derived from extraction operations that use solvent to aid in the separation of the valuable product, such as bitumen, from other components of an ore.

In bitumen extraction operations, various stages of the bitumen extraction can include the addition of hydrocarbon-based solvent to a bitumen-containing mixture in order to produce solvent diluted bitumen and solvent diluted tailings. For instance, oil sands ore can be subjected to primary extraction where the oil sands ore is mixed with water and the resulting slurry is supplied to a primary extraction system that produces tailings and bitumen froth. The bitumen froth can then be subjected to secondary extraction that involves the addition of solvent to the bitumen froth. Secondary extraction can also be referred to as "froth treatment" and may include the addition of paraffinic solvent, naphthenic solvent (often referred to as "diluent"), or other hydrocarbon-based solvents. The bitumen froth includes water and mineral solids that should be removed in order to produce a bitumen stream that can be stored and pipelined. Such solvent-assisted extraction can be carried out in a froth separation unit (FSU) and enables water and mineral solids to be substantially removed from the bitumen froth. The FSU thus produces solvent diluted bitumen and solvent diluted tailings.

Solvent diluted tailings, which may be produced as an underflow stream of the FSU, can include water, mineral solids, residual bitumen, as well as precipitated asphaltene-containing flocs or aggregates when certain precipitation solvents (e.g., paraffinic solvents) are used. Recovering the solvent typically involves supplying the solvent diluted tailings to one or more separation vessels, which are part of a tailings solvent recovery unit (TSRU) and are operated so that the solvent vaporizes and is recovered as an overhead stream while the other less volatile components including water and mineral solids are recovered as a solvent depleted underflow stream.

However, introducing the solvent diluted tailings into the separation vessels of the TSRU can be challenging. For instance, the solvent diluted tailings include solid mineral particles that can increase the wear on equipment particularly in the context of vapour-slurry separation. Premature flashing of the solvent in the feed stream prior to introduction into the chamber of the separation vessel accelerate the solids and cause significant erosion of the inlet equipment. Introducing multiphase streams, such as solvent diluted tailings, for separation of a volatile component from a liquid or slurry component can also be challenging due to complex fluid dynamics and mass transfer phenomena in the inlet equipment and the separation vessels.

SUMMARY

In some implementations, there is provided a process for producing a bitumen product from bitumen froth, comprising:
  adding a solvent to the bitumen froth to produce a solvent diluted froth;
  separating the solvent diluted froth to produce a solvent diluted bitumen component and solvent diluted tailings;
  recovering solvent from the solvent diluted tailings, wherein the recovering comprises:
    introducing the solvent diluted tailings to a flashing chamber through a distributor extending within the flashing chamber, the distributor comprising:
      a tubular portion comprising:
        a tubular wall defining a feed conduit for receiving the solvent diluted tailings; and
        multiple spaced-apart pressure let-down slots provided through the tubular wall and spaced apart along a length thereof, the pressure let-down slots providing fluid communication between the feed conduit and the flashing chamber for introducing the solvent diluted tailings into the flashing chamber; and
      a closed end portion connected to a downstream extremity of the tubular portion;
    recovering flashed solvent from the flashing chamber as a solvent overhead stream; and
    recovering a solvent depleted tailings component from the flashing chamber as an underflow stream; and
  reusing the recovered solvent in the process;
  recovering solvent from the solvent diluted bitumen component to produce a recovered solvent stream and a bitumen product.

In some implementations, there is provided a process for producing a bitumen product from bitumen froth, comprising:
  adding a solvent to the bitumen froth to produce a solvent diluted froth;
  separating the solvent diluted froth to produce a solvent diluted bitumen component and solvent diluted tailings;
  recovering solvent from the solvent diluted tailings, wherein the recovering comprises:
    introducing the solvent diluted tailings to a flashing chamber through a distributor extending within the flashing chamber, the distributor comprising:
      a tubular portion extending into the flashing chamber, the tubular portion comprising:
        a tubular wall defining a feed conduit for receiving the multiphase stream; and
        multiple spaced-apart pressure let-down apertures provided through the tubular wall and spaced apart along a length thereof, the pressure let-down apertures providing fluid communication between the feed conduit and the flashing chamber for introducing the multiphase stream into the flashing chamber; and
      a closed end portion connected to a downstream extremity of the tubular portion, the closed end portion comprising tapered walls defining a flow redirection zone to redirect a bypassed portion of the multiphase stream back toward the pressure let-down apertures recovering flashed solvent from the flashing chamber as a solvent overhead stream; and recovering a solvent depleted tailings component from the flashing chamber as an underflow stream; and reusing the recovered solvent in the process;

recovering solvent from the solvent diluted bitumen component to produce a recovered solvent stream and a bitumen product.

In some implementations, there is provided a method for producing a bitumen product, comprising:

adding a solvent to the bitumen froth to produce a solvent diluted froth;

separating the solvent diluted froth to produce a solvent diluted bitumen component and solvent diluted tailings;

recovering solvent from the solvent diluted tailings, wherein the recovering comprises introducing the solvent diluted tailings to a flashing chamber through a distributor extending within the flashing chamber, wherein design and implementation of the distributor comprises:

providing the flashing chamber with an over-designed distributor having an over-estimated opening size based on an initial process design mode;

operating the flashing chamber in an adjusted mode compared to the initial process design mode to account for the over-estimated opening size of the over-designed distributor;

replacing the over-designed distributor with a re-designed distributor having an adjusted opening size determined based on operation of the flashing chamber in the adjusted mode with the over-designed distributor; and operating the flashing chamber with the re-designed distributor according to the initial process design mode;

recovering flashed solvent from the flashing chamber as a solvent overhead stream; and recovering a solvent depleted tailings component from the flashing chamber as an underflow stream; and reusing the recovered solvent in the process;

recovering solvent from the solvent diluted bitumen component to produce a recovered solvent stream and a bitumen product.

In some implementations, there is provided a tailings solvent recovery unit (TSRU) for recovering solvent from solvent diluted tailings, the TSRU including:

a flash vessel including:

a flashing chamber for receiving the solvent diluted tailings and configured to enable vaporization of the solvent;

a feed inlet line for supplying the solvent diluted tailings to the flash vessel;

a tailings outlet for withdrawing a solvent depleted tailings component from the flashing chamber;

a solvent outlet for withdrawing a recovered solvent component from the flashing chamber; and an inlet spray system fluidly connected to the feed line for receiving the solvent diluted tailings for spraying into the flashing chamber, the inlet spray system including a distributor that includes:

a tubular portion extending into the flashing chamber, the tubular portion including:

a tubular wall defining a feed conduit for receiving the solvent diluted tailings; and multiple spaced-apart pressure let-down slots provided through the tubular wall and spaced apart along a length thereof, the pressure let-down slots providing fluid communication between the feed conduit and the flashing chamber for introducing the solvent diluted tailings into the flashing chamber; and a closed end portion connected to a downstream extremity of the tubular portion.

In some implementations, the tubular portion extends from a side wall of the flash vessel into the flashing chamber. The tubular portion can have a substantially horizontal orientation within the flashing chamber. The tubular portion can be substantially linear within the flashing chamber. The tubular portion can be configured such that the feed conduit has a substantially constant diameter along a length thereof. The tubular portion can be a pipe section and the pressure let-down slots are cut-outs in the tubular wall of the pipe. In some implementations, the inlet spray system includes multiple distributors.

In some implementations, the pressure let-down slots have rectangular shapes. The pressure let-down slots can be provided along a common side of the tubular portion. The pressure let-down slots can be positioned on a bottom part of the tubular portion to introduce the solvent diluted tailings downwardly into the flashing chamber. The pressure let-down slots can each extend along a corresponding portion of a circumference of the tubular portion. The pressure let-down slots can each extend along about 20% to about 50%, or along about 35% to about 45%, of the circumference of the tubular portion. The pressure let-down slots can be clustered together proximate to the closed end portion. The pressure let-down slots can include at least three pressure let-down slots.

In some implementations, the pressure let-down slots are substantially identical to each other in shape and size. The pressure let-down slots can have a transverse orientation with respect to a longitudinal axis of the tubular portion. The pressure let-down slots are spaced-apart such that each pair of adjacent pressure let-down slots defines a corresponding strip each having a substantially same width. The strips can have substantially the same wall thickness.

In some implementations, the pressure let-down slots each include a throat defined by throat walls, an upstream edge, and a downstream edge. The throat walls can include smooth surfaces to inhibit cavitation within the throat and/or the upstream edge can be smooth-edged to inhibit cavitation within the throat.

In some implementations, the pressure let-down slots include at least one downstream pressure let-down slot positioned proximate to the closed end portion to facilitate expelling backflow of the solvent diluted tailings from the closed end portion into the flashing chamber.

In some implementations, the flash vessel is a first stage flash vessel, and further including a second stage flash vessel for receiving at least a portion of the solvent depleted tailings component from the first stage flash vessel, the second stage flash vessel including a second stage inlet spray system substantially identical to that of the first stage flash vessel. In some implementations, the first stage flash vessel is configured to receive a first solvent diluted tailings stream including a high solvent content, and the pressure let-down slots enable explosion flashing of solvent upon introduction of the first solvent diluted tailings stream into the corresponding flashing chamber; and the second stage flash vessel is configured to receive the solvent depleted tailings component from the first stage flash vessel, and the pressure let-down slots enable formation of fan-shaped streams upon introduction into the corresponding flashing chamber.

In some implementations, the closed end portion includes tapered walls defining a flow redirection zone to redirect a bypassed portion of the solvent diluted tailings back toward the pressure let-down slots. The closed end portion can have continuous and smooth surfaces and defines a degenerate ellipsoid cap.

In some implementations, the tubular portion is connected to a retractable lance, and has an internal diameter that is substantially identical to that of the retractable lance.

In some implementations, there is provided a tailings solvent recovery process for recovering a solvent from solvent diluted tailings, the process including:
    introducing the solvent diluted tailings to a flashing chamber through a distributor extending within the flashing chamber, the distributor including:
        a tubular portion including:
            a tubular wall defining a feed conduit for receiving the solvent diluted tailings; and
            multiple spaced-apart pressure let-down slots provided through the tubular wall and spaced apart along a length thereof, the pressure let-down slots providing fluid communication between the feed conduit and the flashing chamber for introducing the solvent diluted tailings into the flashing chamber; and
        a closed end portion connected to a downstream extremity of the tubular portion;
    recovering flashed solvent from the flashing chamber as a solvent overhead stream; and
    recovering a solvent depleted tailings component from the flashing chamber as an underflow stream.

In some implementations, there is provided a tailings solvent recovery unit (TSRU) for recovering solvent from solvent diluted tailings, the TSRU including:
    a flash vessel including:
        a flashing chamber for receiving the solvent diluted tailings and configured to enable vaporization of the solvent;
        a feed inlet line for supplying the solvent diluted tailings to the flash vessel;
        a tailings outlet for withdrawing a solvent depleted tailings component from the flashing chamber;
        a solvent outlet for withdrawing a recovered solvent component from the flashing chamber; and
        an inlet spray system fluidly connected to the feed line for receiving the solvent diluted tailings for spraying into the flashing chamber, the inlet spray system including:
            a tubular portion extending into the flashing chamber and including:
                a tubular wall defining a feed conduit for receiving the solvent diluted tailings, and
                multiple spaced-apart pressure let-down apertures provided through the tubular wall and spaced apart along a length thereof, the pressure let-down apertures providing fluid communication between the feed conduit and the flashing chamber for introducing the solvent diluted tailings into the flashing chamber; and
            a closed end portion connected to a downstream extremity of the tubular portion, the closed end portion including tapered walls defining a flow redirection zone to redirect a bypassed portion of the solvent diluted tailings back toward the pressure let-down apertures.

In some implementations, the tapered walls include curved internal surfaces. The curved internal surfaces can be shaped to define the flow redirection zone in the shape of an ellipsoid cap having an axis generally aligned with a longitudinal axis of the tubular portion. The ellipsoid cap can be an oblate ellipsoidal cap. The ellipsoid cap can be a degenerate ellipsoidal cap. The curved internal surfaces can be substantially symmetrical about a central longitudinal axis.

In some implementations, the curved internal surfaces are continuous and smooth. The curved internal surfaces can be shaped and configured to avoid increased solvent content and solids accumulation in the flow redirection zone. The closed end portion and the tubular portion can have an integral one-piece structure. The curved internal surfaces can be, for example, machine-milled.

In some implementations of the above-mentioned TSRU, each pressure let-down aperture is shaped as a slot. Such slots can have one or more features of the slots described herein.

In some implementations, there is provided a tailings solvent recovery process for recovering a solvent from solvent diluted tailings, the process including:
    introducing the solvent diluted tailings to a flashing chamber through a distributor extending within the flashing chamber, the distributor including:
        a tubular portion extending into the flashing chamber and including:
            a tubular wall defining a feed conduit for receiving the solvent diluted tailings, and
            multiple spaced-apart pressure let-down apertures provided through the tubular wall and spaced apart along a length thereof, the pressure let-down apertures providing fluid communication between the feed conduit and the flashing chamber for introducing the solvent diluted tailings into the flashing chamber; and
        a closed end portion connected to a downstream extremity of the tubular portion, the closed end portion including tapered walls defining a flow redirection zone to redirect a bypassed portion of the solvent diluted tailings back toward the pressure let-down apertures;
    recovering flashed solvent from the flashing chamber as a solvent overhead stream; and
    recovering a solvent depleted tailings component from the flashing chamber as an underflow stream.

In some implementations, there is provided a tailings solvent recovery unit (TSRU) for recovering solvent from solvent diluted tailings, the TSRU including:
    a first stage separation vessel configured to receive a first feed stream including the solvent diluted tailings and produce a first stage solvent component and a first stage solvent-depleted tailings component;
    a second stage separation vessel configured to receive a second feed stream including the first stage solvent-depleted tailings component and produce a second stage solvent component and a second stage solvent-recovered component;
    the first and second stage separation vessels each including distributors for spraying the first and second feed streams respectively therein, each distributor including:
        a tubular portion including:
            a tubular wall defining a feed conduit for receiving the solvent diluted tailings; and multiple spaced-apart pressure let-down slots provided through the tubular wall and spaced apart along a length thereof perpendicular to a feed flow direction, the pressure let-down slots providing fluid communication between the feed conduit and a flashing chamber of the corresponding first or second stage separation vessel; and a closed end portion connected to a downstream extremity of the tubular portion, the closed end portion including curved surfaces defining a flow redirection zone to redirect a bypassed portion of the solvent diluted tailings back toward the pressure let-down slots.

In some implementations, there is provided a system for recovering a volatile component from a slurry, the system including:

a flash vessel including:

a flashing chamber for receiving the slurry and configured to enable vaporization of the volatile component;

a feed inlet line for supplying the slurry to the flashing chamber;

a slurry outlet for withdrawing a volatile component depleted slurry from the flashing chamber;

a volatile component outlet for withdrawing a recovered volatile component from the flashing chamber; and an inlet spray system fluidly connected to the feed line for receiving the slurry for spraying into the flashing chamber, the inlet spray system including a distributor that includes:

a tubular portion extending into the flashing chamber, the tubular portion including:

a tubular wall defining a feed conduit for receiving the slurry; and multiple spaced-apart pressure let-down slots provided through the tubular wall and spaced apart along a length thereof, the pressure let-down slots providing fluid communication between the feed conduit and the flashing chamber for introducing the slurry into the flashing chamber; and a closed end portion connected to a downstream extremity of the tubular portion.

In some implementations, there is provided a system for recovering a volatile component from a slurry, the system including:

a flash vessel including:

a flashing chamber for receiving the slurry and configured to enable vaporization of the volatile component;

a feed inlet line for supplying the slurry to the flashing chamber;

a slurry outlet for withdrawing a volatile component depleted slurry from the flashing chamber;

a volatile component outlet for withdrawing a recovered volatile component from the flashing chamber; and an inlet spray system fluidly connected to the feed line for receiving the slurry for spraying into the flashing chamber, the inlet spray system including a distributor that includes:

a tubular portion extending into the flashing chamber, the tubular portion including:

a tubular wall defining a feed conduit for receiving the slurry; and multiple spaced-apart pressure let-down apertures provided through the tubular wall and spaced apart along a length thereof, the pressure let-down apertures providing fluid communication between the feed conduit and the flashing chamber for introducing the slurry into the flashing chamber; and a closed end portion connected to a downstream extremity of the tubular portion, the closed end portion including tapered walls defining a flow redirection zone to redirect a bypassed portion of the slurry back toward the pressure let-down apertures.

In some implementations, there is provided a system for separating a multiphase stream into a volatile component and a liquid component, the system including:

a flash vessel including:

a flashing chamber for receiving the multiphase stream and configured to enable vaporization of the volatile component;

a feed inlet line for supplying the multiphase stream to the flashing chamber;

a liquid outlet for withdrawing the liquid component from the flashing chamber;

a volatile component outlet for withdrawing a recovered volatile component from the flashing chamber; and an inlet spray system fluidly connected to the feed line for receiving the multiphase stream for spraying into the flashing chamber, the inlet spray system including a distributor that includes:

a tubular portion extending into the flashing chamber, the tubular portion including:

a tubular wall defining a feed conduit for receiving the multiphase stream; and multiple spaced-apart pressure let-down slots provided through the tubular wall and spaced apart along a length thereof, the pressure let-down slots providing fluid communication between the feed conduit and the flashing chamber for introducing the multiphase stream into the flashing chamber; and a closed end portion connected to a downstream extremity of the tubular portion.

In some implementations, there is provided a system for separating a multiphase stream into a volatile component and a liquid component, the system including:

a flash vessel including:

a flashing chamber for receiving the multiphase stream and configured to enable vaporization of the volatile component;

a feed inlet line for supplying the multiphase stream to the flashing chamber;

a liquid outlet for withdrawing the liquid component from the flashing chamber;

a volatile component outlet for withdrawing a recovered volatile component from the flashing chamber; and an inlet spray system fluidly connected to the feed line for receiving the multiphase stream for spraying into the flashing chamber, the inlet spray system including a distributor that includes:

a tubular portion extending into the flashing chamber, the tubular portion including:

a tubular wall defining a feed conduit for receiving the multiphase stream; and multiple spaced-apart pressure let-down apertures provided through the tubular wall and spaced apart along a length thereof, the pressure let-down apertures providing fluid communication between the feed conduit and the flashing chamber for introducing the multiphase stream into the flashing chamber; and a closed end portion connected to a downstream extremity of the tubular portion, the closed end portion including tapered walls defining a flow redirection zone to redirect a bypassed portion of the multiphase stream back toward the pressure let-down apertures.

In some implementations, there is provided a tailings solvent recovery unit (TSRU) distributor for introducing solvent diluted tailings stream into a flashing chamber, the distributor including:

a tubular portion including:
  a tubular wall defining a feed conduit for receiving the solvent diluted tailings; and
  multiple spaced-apart pressure let-down slots provided through the tubular wall and spaced apart along a length thereof perpendicular to a feed flow direction, the pressure let-down slots providing fluid communication between the feed conduit and the flashing chamber; and
a closed end portion connected to a downstream extremity of the tubular portion, the closed end portion including curved internal surfaces defining a flow redirection zone to redirect a bypassed portion of the solvent diluted tailings back toward the pressure let-down slots.

In some implementations, the tubular portion is configured such that the feed conduit has a substantially constant diameter along a length thereof. The tubular portion can be a pipe section and the pressure let-down slots are cut-outs in the tubular wall of the pipe.

In some implementations, the pressure let-down slots have rectangular shapes. The pressure let-down slots can be provided along a common side of the tubular portion. The pressure let-down slots can be positioned on a bottom part of the tubular portion to introduce the solvent diluted tailings downwardly into the flashing chamber. The pressure let-down slots can each follow a curvature of the tubular portion. The pressure let-down slots can be clustered together proximate to the closed end portion. The pressure let-down slots can include at least three, or three, pressure let-down slots. The pressure let-down slots can be substantially identical to each other in shape and size, although the pressure let-down slots can be sized differently from each other. The pressure let-down slots can be sized according to solids content exiting each corresponding pressure let-down slot, and/or sized according to solvent content exiting each corresponding pressure let-down slot.

In some implementations, the pressure let-down slots are spaced-apart such that each pair of adjacent pressure let-down slots defines a corresponding strip each having a same width. The strips can have substantially the same wall thickness as each other.

In some implementations, the pressure let-down slots each include a throat defined by throat walls, an upstream edge, and a downstream edge. The throat walls can include smooth surfaces to inhibit cavitation within the throat and/or the upstream edge is smooth-edged to inhibit cavitation within the throat. The pressure let-down slots can include at least one downstream pressure let-down slot positioned proximate to the closed end portion to facilitate expelling backflow of the solvent diluted tailings from the closed end portion into the flashing chamber.

In some implementations, the curved internal surfaces are shaped to define the flow redirection zone in the shape of an ellipsoid cap having an axis generally aligned with a longitudinal axis of the tubular portion. The ellipsoid cap can be an oblate ellipsoidal cap, which can be degenerate. The curved internal surfaces can be continuous and smooth. The curved internal surfaces can be shaped and configured to avoid increased solvent content and solids accumulation in the flow redirection zone. The closed end portion and the tubular portion can have an integral one-piece structure, and the curved internal surfaces can be machine-milled. The curved internal surfaces can also be substantially symmetrical about a central longitudinal axis.

In some implementations, the tubular portion includes an upstream section configured to be connectable to a retractable lance. The tubular portion can have an internal diameter that is constant along the length thereof. The tubular portion can have an internal diameter that is substantially identical to that of the retractable lance.

In some implementations, there is provided a tailings solvent recovery unit (TSRU) for recovering solvent from solvent diluted tailings, the TSRU including:

a flash vessel including:
  a flashing chamber for receiving the solvent diluted tailings and configured to enable vaporization of the solvent;
  a feed inlet line for supplying the solvent diluted tailings to the flash vessel;
  a tailings outlet for withdrawing a solvent depleted tailings component from the flashing chamber;
  a solvent outlet for withdrawing a recovered solvent component from the flashing chamber; and
  an inlet spray system fluidly connected to the feed line for receiving the solvent diluted tailings for spraying into the flashing chamber, the inlet spray system including:
    a tubular portion extending into the flashing chamber and including:
      a tubular wall defining a feed conduit for receiving the solvent diluted tailings, and
      multiple spaced-apart pressure let-down apertures provided through the tubular wall and spaced apart along a length thereof, providing fluid communication between the feed conduit and the flashing chamber for introducing the solvent diluted tailings into the flashing chamber, the pressure let-down apertures having different open areas sized in accordance with solids and solvent content of the solvent diluted tailings exiting each pressure let-down aperture; and
    a closed end portion connected to a downstream extremity of the tubular portion.

In some implementations, there is provided an inlet assembly for introducing solvent diluted tailings into a flashing chamber of a tailings solvent recovery unit (TSRU), the inlet assembly including:

a distributor including:
  a tubular portion extending into the flashing chamber and including:
    a tubular wall defining a feed conduit for receiving the solvent diluted tailings and having a constant internal diameter; and
    multiple spaced-apart pressure let-down apertures provided through the tubular wall and spaced apart along a length thereof, providing fluid communication between the feed conduit and the flashing chamber for introducing the solvent diluted tailings into the flashing chamber; and a closed end portion connected to a downstream extremity of the tubular portion; and a retractable lance for supporting and retractably extending the distributor into the flashing chamber, the retractable lance including:

a tubular conduit having an internal diameter that is substantially the same as that of the tubular portion of the distributor;

an upstream portion for receiving a flow of the solvent diluted tailings; and a downstream portion coupled to the tubular portion of the distributor for feeding the flow of the solvent diluted tailings thereto.

In some implementations, the multiple spaced-apart pressure let-down apertures are slots oriented perpendicular to a feed flow direction.

In some implementations, the closed end portion includes curved internal surfaces defining a flow redirection zone to redirect a bypassed portion of the solvent diluted tailings back toward the pressure let-down apertures.

In some implementations, the tubular conduit of the lance and the tubular wall of the distributor are coupled together to provide a substantially co-planar tubular surface therebetween.

In some implementations, the inlet assembly has one of more features related to the slots and/or closed end portion, as described herein.

In some implementations, there is provided a method for designing distributors for use in a system for separating a multiphase stream into a volatile component and a liquid component, the method including:

providing the system with an over-designed distributor having an over-estimated opening size based on an initial process design mode;

operating the system in an adjusted mode compared to the initial process design mode to account for the over-estimated opening size of the over-designed distributor;

replacing the over-designed distributor with a re-designed distributor having an adjusted opening size determined based on operation of the system in the adjusted mode with the over-designed distributor; and operating the system with the re-designed distributor according to the initial process design mode.

In some implementations, the over-designed distributor is designed using the Homogeneous Equilibrium Model (HEM). The adjusted mode can include increasing a pressure drop across apertures of the over-designed distributor. The adjusted mode can include reducing an effective opening size by equipping the over-designed distributor with a size-reducing element. In some implementations, the size-reducing element includes an overlay plate.

In some implementations, the adjusted mode includes increasing a feed pressure of a feed stream supplied to the over-designed distributor. Increasing the feed pressure can include recirculating an underflow stream including the liquid component after separation from the volatile component; and/or adding water into the feed stream.

In some implementations, the system described in the context of the above method includes a tailings solvent recovery unit (TSRU), which can be part of a paraffinic bitumen froth treatment operation.

In some implementations, the over-designed distributor and/or the re-designed distributor have one or more features as described herein.

The techniques and implementations described herein can have one or more of the following advantages: the slot-shaped pressure let-down apertures can facilitate manufacturing as well as provide effective mitigation of pre-flashing and solids segregation issues; the closed tapered end portion, which optionally has curved surfaces, can also facilitate mitigation of segregation issues and redirection of fluids from the end back toward the apertures; and various distributor geometries, recovery unit systems, and related methods can enable effective and operationally flexible separation of volatile solvent from solvent diluted tailings.

BRIEF DESCRIPTION OF DRAWINGS

FIGS. 12 and 13 are side cross-sectional views of example slot apertures.

FIG. 14 is a side cross-sectional view of part of a slot showing upstream and downstream edges.

DETAILED DESCRIPTION

Solvent diluted tailings can be introduced into a separation vessel via a spray inlet system that includes a distributor that can have various features, such as multiple spaced-apart pressure let-down slots and a closed end portion having curved tapered walls. The distributor can be used in a system that includes at least two separation vessels operated in series, where the same distributor design is used in both the first and second separation vessels. In some implementations, the distributor facilitates control of pressure drop across the open area of the slots and prevention of solvent pre-flashing.

General TSRU Implementations

Figure 1:
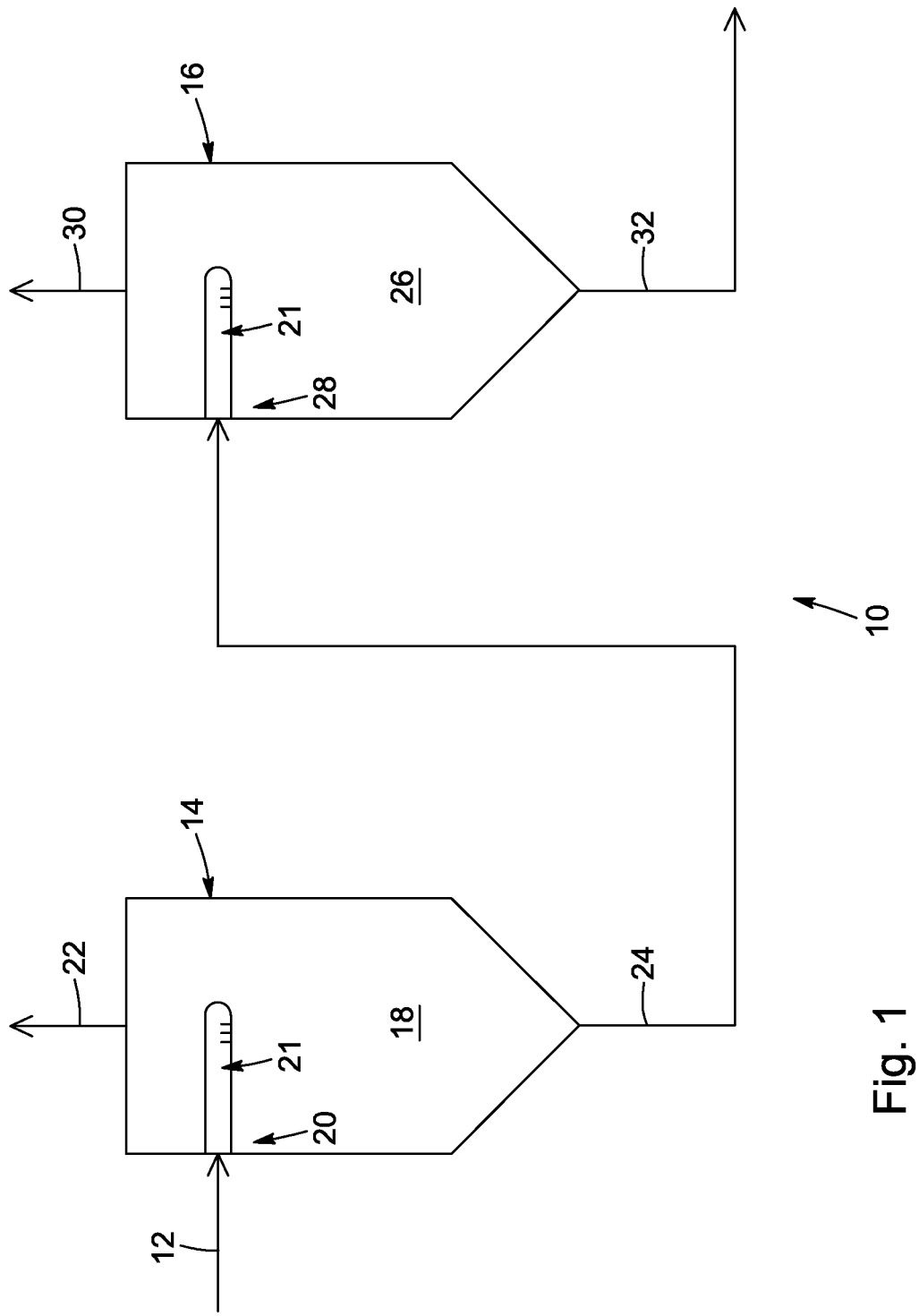
FIG. 1 is a process flow diagram of a TSRU including two separation vessels.

Referring to FIG. 1, a tailings solvent recovery unit (TSRU) 10 is used to recover solvent from a solvent diluted tailings stream 12. The solvent diluted tailings stream 12 may be derived from a bitumen froth separation unit (FSU), more particularly as an underflow stream withdrawn from a second stage gravity separator that is part of the FSU. The solvent diluted tailings stream 12 includes water, solid mineral material, residual bitumen components, and solvent. The solvent may include paraffinic solvent, naphthenic solvent, and/or other solvents capable of promoting separation of bitumen from bitumen froth.

It should be understood that the term "solvent diluted tailings" refers to a tailings suspension that includes water, solid particulate material, and a hydrocarbon component referred to herein as a "solvent". For solvent diluted tailings that are derived from an FSU, additional compounds such as residual bitumen can also be present in the tailings. In addition, the solvent is not necessarily present in the tailings so as to function as a "diluent" in the sense of diluting extractable hydrocarbons from the tailings, and thus the term "diluted" in "solvent diluted tailings" should be seen as referring to the solvent simply being present in the tailings. In this sense, the term "solvent diluted tailings" can also be referred to as "solvent affected tailings" where there is sufficient solvent to merit subjecting the tailings to removal. In some scenarios, the solvent diluted tailings are fed to a TSRU or other types of solvent recovery units.

The TSRU 10 can include one or more stages. In FIG. 1, the TSRU 10 includes a first stage flash vessel 14 and a second stage flash vessel 16 arranged in series. It should be noted that various other vessel arrangements are possible, and that multiple trains of one- or two-stage TSRUs may be used. The solvent diluted tailings stream 12 is supplied to the first stage flash vessel 14 (also referred to as a "separation vessel") and is introduced into a flashing chamber 18 via an inlet spray system 20 that includes a distributor 21, which will be described in further detail below. The solvent diluted tailings stream 12 introduced into the first stage flash vessel 14 separates to form a gas phase solvent stream 22 that is recovered as an overhead stream, and a first stage tailings component 24 partially depleted of solvent and recovered as an underflow stream. The first stage tailings component 24 can then be supplied to the second stage flash vessel 16 and introduced into a second flashing chamber 26 via a second stage inlet spray system 28. The second inlet spray system 28 also includes at least one distributor 21 that may be similar or identical in construction as the first stage distributor 21. A second separated solvent stream 30 is recovered from the second stage flash vessel 16 and a solvent recovered tailings stream 32 (which may also be referred to as "froth treatment tailings" or FTT) is withdrawn as underflow.

It should be noted that the TSRU can have various other features not illustrated in FIG. 1. For example, part of the underflow streams can be recirculated back into the feed streams supplied into the flash vessels and/or recycled directly back into a lower part of the flash vessels. Recirculation of underflow streams back into feed streams that are supplied to the distributors can be operated to ensure a consistent pressure drop across the distributors apertures even during periods of low flow.

Distributor Design Implementations

Figure 2:
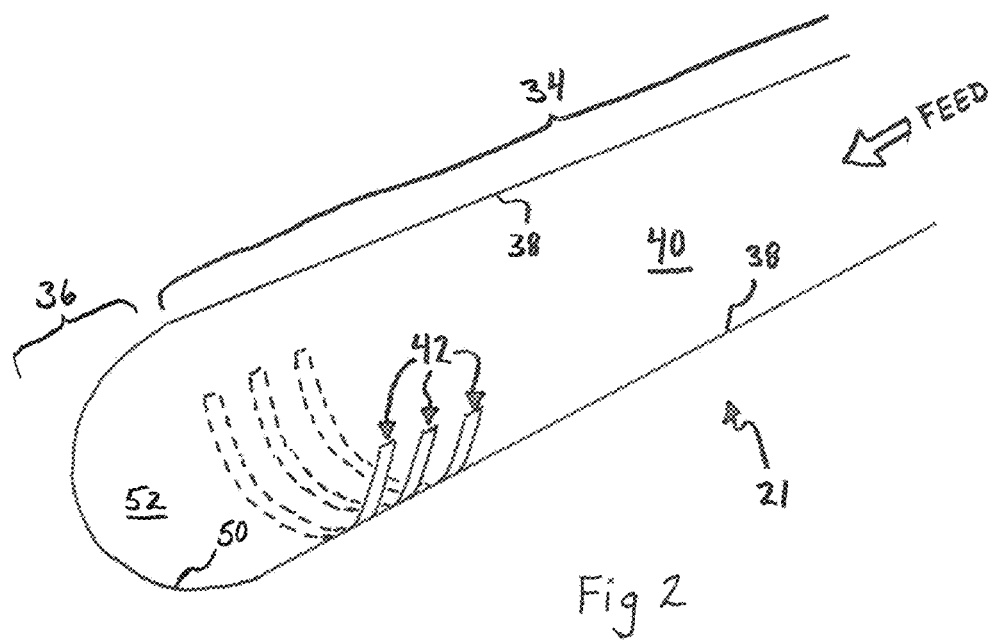
FIG. 2 is a perspective partially-transparent view schematic of part of a distributor.
Figure 3:
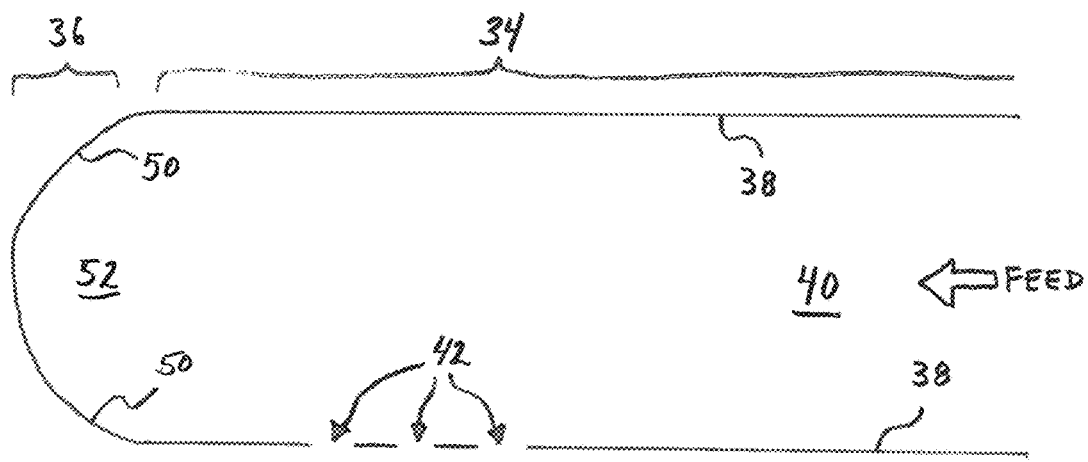
FIG. 3 is a side cross-sectional view schematic of part of a distributor.

Referring to FIGS. 2 and 3, in some implementations the distributor 21 includes a tubular portion 34 extending into the flashing chamber of the separation vessel, and a closed end portion 36 at the downstream extremity of the tubular portion 34. The tubular portion 34, which can be cylindrical, has side walls 38 defining a feed conduit 40 for receiving the solvent diluted tailings 12. The tubular portion 34 also includes one or more pressure let-down apertures 42 provided through the side walls 38. The pressure let-down apertures 42 provide fluid communication between the feed conduit 40 and the flashing chamber (not illustrated here) for introducing the solvent diluted tailings into the flashing chamber.

In some implementations, the pressure let-down apertures 42 are slots as illustrated in FIGS. 2 and 3. Such slot-shaped apertures 42 can facilitate providing a thinner sheet-type spray compared to flow through a hole or circular orifice, increasing surface area of the discharged flow to enhance solvent separation. Thinner sheet-type spray can aid in jet dissipation of the injected solvent diluted tailings, facilitating gases to dissipate at a lower velocity more readily when introduced into the flash vessel in comparison to a circular jet. Such circular jets can tend to concentrate the flow toward a localized area, increasing erosion potential and reducing separation of volatile components (e.g., solvent) from the slurry components. In addition, the slots 42 can be provided as rectangular cut-outs in the tubular portion 34, thus facilitating manufacturing of the distributor 21 by providing the cut-outs in a pipe that can have a diameter that is equal to the diameter of upstream equipment (e.g., lance, feedline, etc.) in order to avoid step changes in area prior to the slots 42. The cut-outs can be generally rectangular and can follow a cross-sectional curvature of the tubular portion 34, although the slots can also have other shapes and configurations.

In some implementations, the distributor 21 has multiple pressure let-down slots 42 arranged in series along a downstream part of the tubular portion 34. The multiple slots 42 can be designed in order to provide a total open area to obtain choked flow and solvent flashing at the given process conditions. Splitting the flow out of the distributor 21 through multiple slots 42 can also facilitate momentum diffusion compared to a single large orifice. In addition, the slots 42 may be spaced apart from each other to avoid 'cross-talk' such that the inlet sprays from the slots do not substantially converge and thus remaining relatively separate within the flashing chamber until the solvent depleted fluid accumulates in the bottom of the separation vessel. Alternatively, the sprays from the corresponding slots can coalesce a certain distance downstream of the slot discharge as the sprays experience dissipation.

FIGS. 2 and 3 illustrate a distributor 21 with three slots 42 arranged in series at the downstream end of the tubular portion 34. The slots 42 may have substantially the same shape and area to each other. Alternatively, the size and/or shape of the slots may be different from each other, and may be provided according to flow segregation and composition of the feed stream (e.g., the solvent diluted tailings 12 or the first stage tailings component 24, as shown in FIG. 1).

A distributor design having multiple slots 42 along the tubular portion 34 provides the opportunity to refine each of the slots to have a unique size or shape based on flow characteristics of the feed stream, which can facilitate control of the pressure drop across the slots and limit pre-flashing. For example, solids can tend to segregate toward a bottom region of the feed stream and thus an upstream slot can receive material having higher solids content compared to a downstream slot. Such solids segregation can influence the pressure drop requirements across the slots for limiting pre-flashing within the distributor. Thus, the distributor design can be adapted by modifying the size of different upstream or downstream slots to ensure the adequate pressure drop across each slot for discouraging pre-flashing within the distributor. For example, if the solvent content is higher downstream, a downstream slot can have a smaller area compared to an upstream slot in order to mitigate potential pre-flashing in the downstream portion of the distributor. In addition, due to solids segregation, the upstream slot can be sized to be larger than the downstream slots to better handle the larger solids contents in the material expelled from the upstream slot. Furthermore, the sizing of each slot and spacing between the slots can be provided based on a pre-determined composition being expelled from each slot.

Referring still to FIGS. 2 and 3, in some implementations the distributor 21 has one or more slots 42 that are oriented in generally perpendicular relation to the flow of the feed stream. Perpendicular slots not only facilitate manufacturing as cut-outs perpendicular to a longitudinal axis of a pipe, but also provide advantages in terms of mitigating pre-flashing issues and dealing with solids segregation issues. Indeed, multiple perpendicular slots are more suited for mitigating effects of pre-flashing compared to parallel slots. As mentioned previously, solids can tend to naturally segregate toward the bottom of the pipe. With multiple slots perpendicular to the flow, more solids may tend to discharge through the first slot. In such a scenario, a bulk of the solids may be separated from the main flashing flow, meaning that fewer solids would be accelerated in the location where solvent flashing will be more dominant which would be expected to exist at the remaining slots downstream of the first slot. Thus, detrimental effects due to any pre-flashing that may occur proximate to downstream slots may be reduced due to lower solids content in the slurry at those downstream locations within the distributor. It should be noted that such effects also depend on feed composition and operating conditions of the TSRU.

In some implementations, the slots 42 have a curvature that follows the curvature of the tubular portion 34, as illustrated in FIG. 2. Curved slots that follow the curvature of the tubular portion 34 can facilitate longer slot geometries, providing a thinner sheet-type spray and enhancing dissipation of the flow in multiple directions (e.g., downward and sideways), reducing fluid velocity and risk of erosion within the separation vessel. In addition, slots 42 that follow the curvature of the tubular portion 34 can have consistent edges and throat wall orientations for enhanced flow consistency along the entire slot length.

Figure 4:
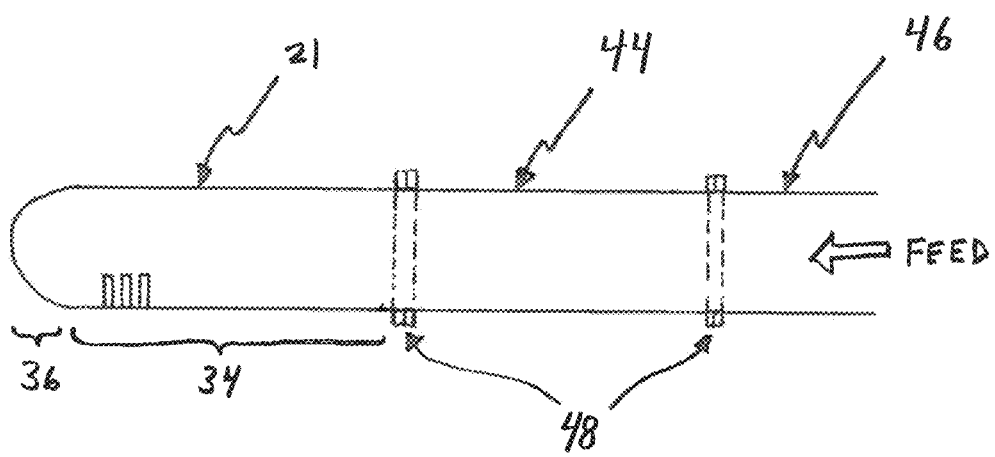
FIG. 4 is a side cross-sectional view schematic of a distributor and a lance.

Referring now to FIG. 4, the tubular portion 34 of the distributor 21 may be connected to an upstream lance 44 that is, in turn, connected to an upstream slurry pipeline 46. Various connection devices 48 can be used to interconnect the different components. The lance 44 can be configured for retractably inserting the distributor 21 within the flashing chamber, such that the distributor 21 can be retracted for repair, maintenance, inspection or replacement. The tubular portion 34 of the distributor 21 can have an internal diameter that is equal to that of the lance 44 in order to eliminate any step change in area prior to the slots 42. In other words, the internal surfaces of the tubular portion 34 and the lance 44 are substantially co-planar. It is advantageous to avoid a step change in area between the lance 44 and the slots 42. Step changes can lead to localized turbulence which can increase velocities of the multiphase stream leading to a higher risk of erosion. Step changes can also limit pressure available for flow through the slots which can lead to pre-flashing.

Referring back to FIGS. 2 and 3, in some implementations the closed end portion 36 of the distributor 21 includes tapered walls 50 defining a flow redirection zone 52 to redirect a bypassed portion of the solvent diluted tailings back toward the pressure let-down apertures 42. The tapered walls 50 can have a variety of configurations. For instance, the tapered walls 50 can be curved internal surfaces that are generally continuous and smooth. The tapered walls 50 can define an ellipsoid cap, which can be generally spherical. In some implementations, the closed end portion 36 is formed as a generally rounded cap, which provides reduced "dead" zones and solvent pockets within the rounded cap space, thereby promoting enhanced solvent mixing and discouraging accumulation of solids within the volume of the distributor.

Referring now to FIGS. 5a to 5e, various example designs of the distributor 21 are illustrated. Each of the distributor designs can have certain characteristics and benefits. For instance, the distributor design of FIG. 5a can provide more space for flow acceleration. The distributor design of FIG. 5b can provide ease of manufacturing. The distributor design of FIG. 5c can provide enhanced flow characteristics at the rounded cap end. The distributor design of FIG. 5d can provide a smooth decrease in pressure in the tapered end region. The distributor design of FIG. 5e can provide fully downward flow from the slots to avoid lateral spray against vessel side walls, which can be advantageous for narrower vessels. While the example distributor designs illustrated here have three slots, it should be noted that the slot size and number can be adjusted to obtain the desired total open area and discharge flow characteristics.

Figure 6:
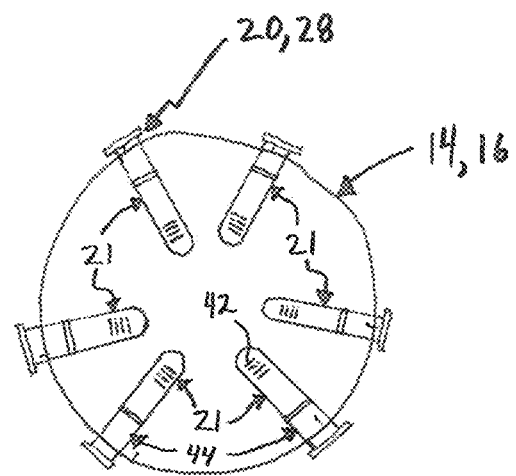
FIG. 6 is a top cross-sectional view schematic of a separation vessel with distributors.

Referring now to FIG. 6, in some implementations, multiple distributors 21 can be provided in one or both of the separation vessels 14, 16 that are part of the TSRU. In some implementations, the distributors 21 are provided at a same height within each separation vessel 14, 16 such that the end of each distributor 21 is positioned in spaced relation with respect to a center vertical axis of the separation vessel. Alternatively, the distributors 21 can be at different heights within the separation vessels, although care should be taken to position each distributor away from any high velocity spray from a nearby distributor 21. Each distributor 21 can be connected to a corresponding lance 44 that is configured to insert and retract the corresponding distributor 21. The lances 44 can be substantially identical to each other, and the distributors 21 can also be substantially identical to each other. Alternatively, the distributors 21 can be different from each other in terms of length of the tubular portion for positioning within the flashing chamber of the vessel and/or in terms of the slot sizing. The number, the location and the design of the distributors 21 within the separation vessel can be provided according to the fluid dynamics, structural features, and operating conditions of the separation vessel. For instance, the distributor arrangement and design in the first stage separation vessel 14 may be different from that of the second separation vessel 16, due to the different composition of the feed streams and the different operating conditions of the two separation vessels. It is also noted that the distributors 21 can be oriented horizontally within the vessels, which the slots oriented for downward discharge of the spray. Alternative orientations can also be used in conjunction with corresponding design of the separation vessel.

Figure 7A:
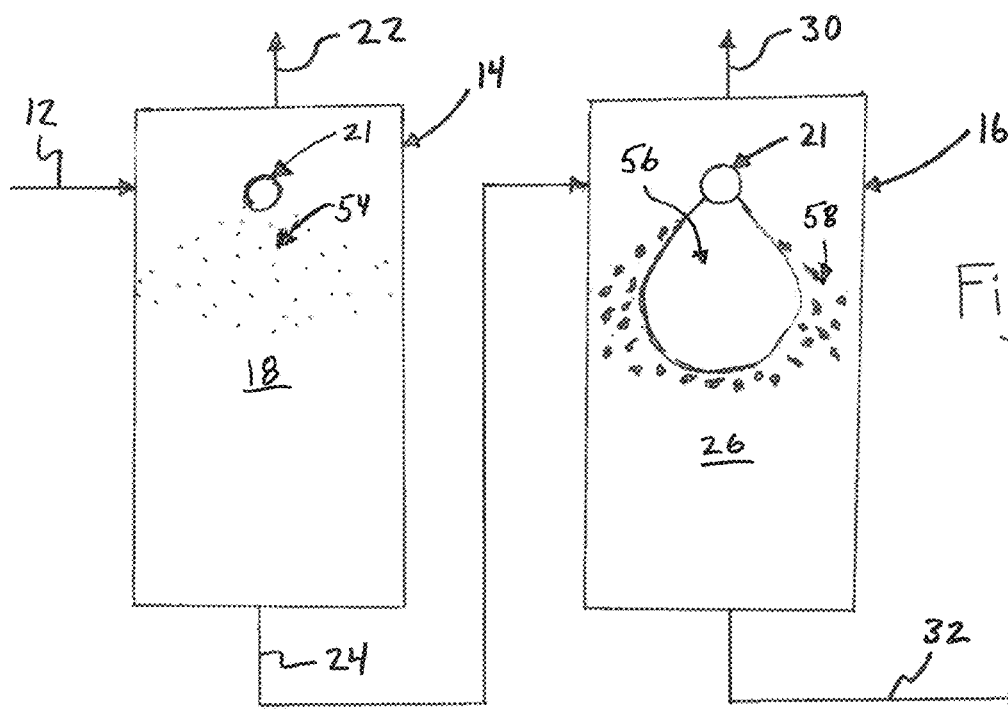
FIGS. 7a to 7c re a process flow diagram of a TSRU including two stages.
Figure 7B:
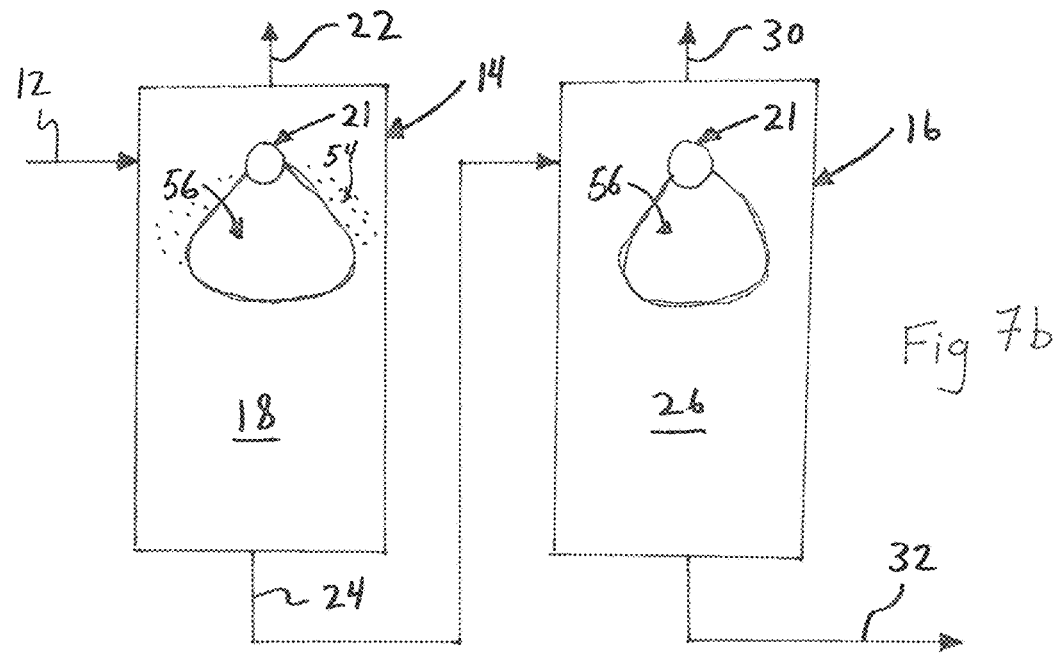
Figure 7C:
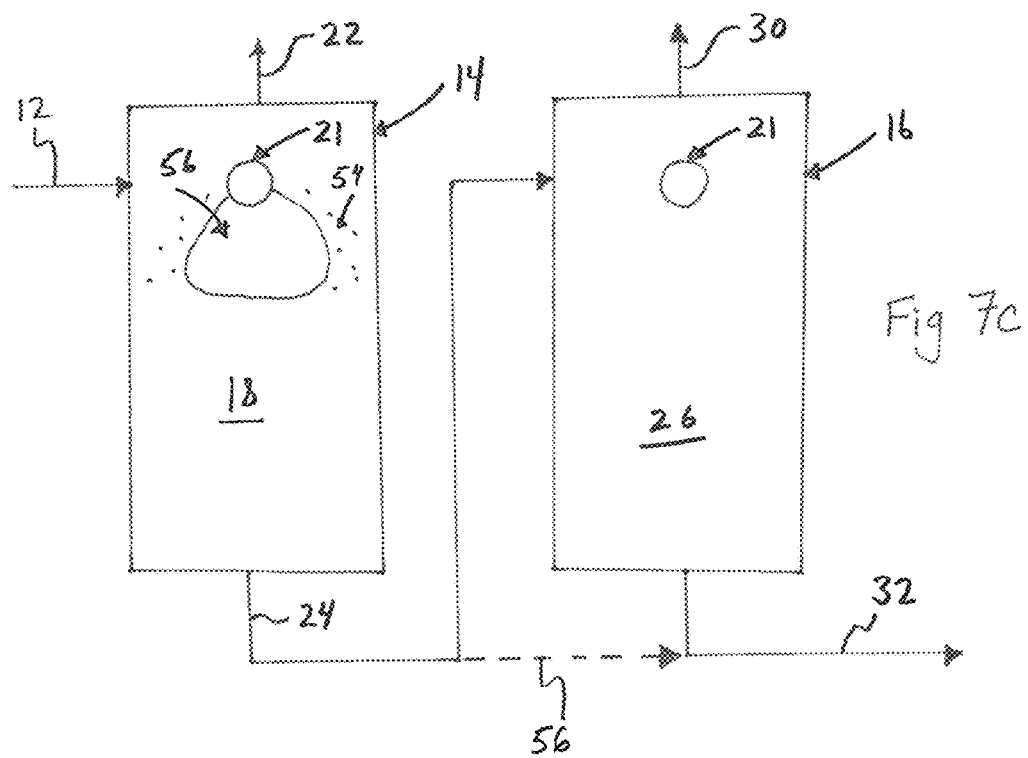

Referring now to FIGS. 7a to 7c, the distributors 21 in the first stage separation vessel 14 and the second stage separation vessel 16 can have identical designs and structural features, but may be operated to obtain different inlet spray characteristics. In this regard, it should be noted that various different operational scenarios can result in certain spray patterns in the separation vessels.

Referring to FIG. 7a, in the first stage separation vessel 14, the spray discharged from the distributor 21 may present flash atomization to form an atomized spray 54. Flash atomization can be promoted by various factors, such as a large pressure difference between the distributor 21 and the first stage flashing chamber 18, sufficient superheating of the feed stream, and high solvent concentrations in the feed stream. The spray pattern in the first stage separation vessel 14 may be referred to as flash atomization or explosive flashing, where a fine spray is present immediately at or near the slot or aperture outlet. On the other hand, in the second stage separation vessel 16, for which the feed stream has a much lower solvent content, the spray discharged from the distributor 21 may have a spray pattern that includes a considerable jet region 56 and a surrounding disintegration region 58. When the distributors 21 have apertures in the form of slots 42, the jet region 56 can take the form of a thin fan or sheet, promoting deceleration of the jet and formation of the disintegration region 58. For a scenario where the solvent diluted tailings 12 has a high solvent content and reasonable solids content, with effective recovery via flash atomization in the first stage separation vessel 14, minimal solvent recovery may be needed in the second stage separation vessel 16 and thus the second stage vessel 16 can be operated under sheet spray conditions, as illustrated in FIG. 7a.

Referring to FIG. 7b, when the solution diluted tailings has a low solvent content, the first stage separation vessel 14 can be operated under predominantly sheet spray conditions, as illustrated, although it should be noted that the feed pressure can be varied to induce atomization if desired (not illustrated here). The second stage separation vessel can also be operated under sheet spray conditions, as illustrated.

Referring to FIG. 7c, when the TSRU is operating in turndown mode in which the tailings feed 12 has very low solvent contents, the first state separation vessel 14 can be operated under predominantly sheet spray conditions, although some atomization can also be obtained. Win such scenarios, the first stage tailings component 24 contains very low solvent and thus can be supplied to the second stage separation vessel 16 operated under sheet spray conditions, or if the solvent content is low enough (e.g., below 0.2 wt %) the second stage can be bypassed, for example via a bypass line 59.

As can be seen from the example scenarios illustrated in FIGS. 7a to 7c, the spray pattern and conditions can vary depending on the operating conditions, particularly depending on the solvent and solids contents of the streams to be expelled via the distributors. Feed pressures, vessel pressures and other operating parameters can be varied depending on incoming solvent and solids contents to promote flash atomization or sheet spray in one or both of the separation vessels 14, 16. Operation of the first and second stages can also vary over time depending, for example, on solvent and solids contents of the feed streams. It should also be noted that TSRUs with only one separation vessel or more than two separation vessels can be operated such that the type of spray (e.g., sheet or atomization) is controlled based on certain process variables, such as the content of one or more components (e.g., solvent, solids, etc.) of the fee stream or other feed stream characteristics.

In a TSRU with first and second separation vessels, as illustrated in FIGS. 1 and 7, the distributors 21 in each of the vessels can enable different functionalities. In the first stage separation vessel, the distributors 21 can provide a pressure let-down for the multiphase feed stream such that pre-flashing and wear is mitigated, while enabling high solvent recovery to be obtained. The functionality of the first stage distributors is significantly influenced by the higher solvent content in the feed stream. In the second stage separation vessel, the distributors 21 can provide a pressure let-down for the multiphase feed stream such that residual solvent can be flashed and captured, while sufficient water is flashed to enhance breakup or dissipation of the jet region. In the context of solvent diluted tailings, which include volatile solvent as well as water, operating conditions can be controlled to regulate the amount of water that is flashed in the separation vessels. Thus, the pressure difference between the distributors and the flashing chambers as well as the temperatures can be controlled to achieve the desired solvent flashing characteristics while also controlling the amount of water that is flashed for each vessel. The water flashing characteristics can be different in the first and second stage separation vessels 14, 16 depending on the feed stream compositions, operating parameters of the vessels, capacities of overhead condensers, and whether steam stripping is used in the vessels, for example.

Figure 8:
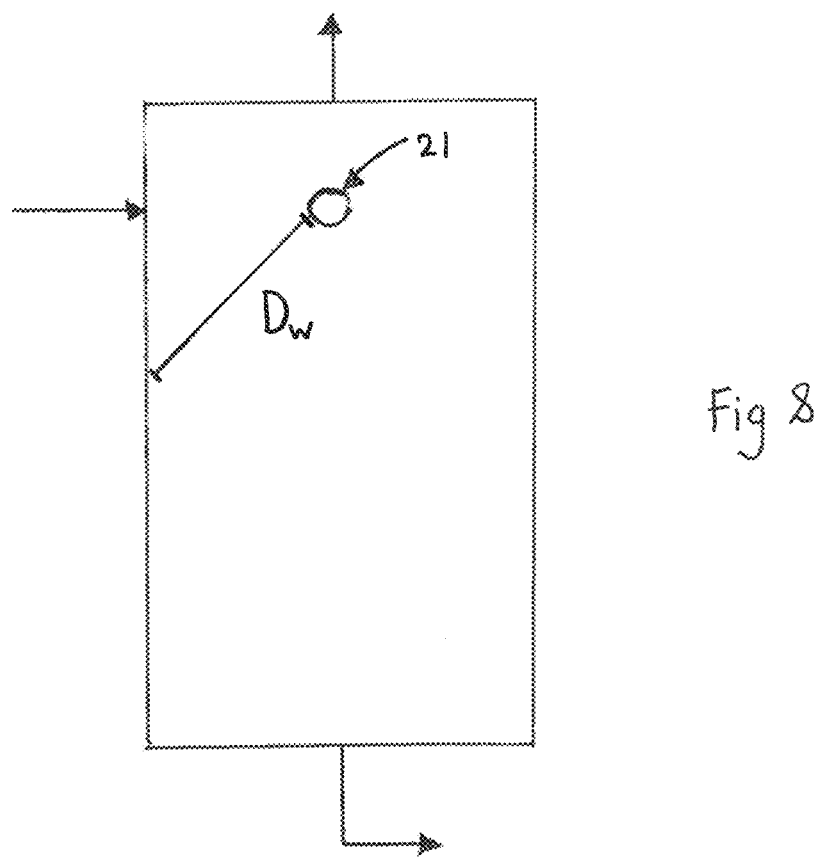
FIG. 8 is a block diagram of a separation vessel.

Referring now to FIG. 8, in implementations where the slots follow the curvature of the tubular section of the distributor 21 and thus enable part of the discharged tailings to have a lateral trajectory, the location of the distributor 21 and the length of the slots can be provided to avoid detrimentally high velocities at the side walls of the separation vessel. In some implementations, the distance $D_W$ between an extremity of the curved slot and the closest point on the side wall of the separation vessel that would be impacted by the discharged spray, is large enough to avoid impact of jet-type flow against the side wall and/or to avoid flow having a velocity above 15 m/s, above 10 m/s, above 7 m/s or above 5 m/s. In some scenarios, an impact velocity of 1 m/s to 7 m/s or 3 m/s to 5 m/s can be provided. Thus, only lower velocity flows of the tailings material can impact the side wall of the separation vessel. In this regard, it is noted that erosion rates are generally proportional to the velocity squared, or even higher (e.g., in the case of sharp edge slots or apertures), and thus reducing impact velocity can have a significant benefit on reducing erosion rates in such applications.

The sizing of the separation vessel, the operating conditions such as temperature and pressure of the feed stream and the flashing chamber, as well as the distributor construction can be provided to obtain the desired tailings flow characteristics. In some implementations, the length of the curved slots is also provided to avoid horizontal spray of the tailings, and thus the slots would terminate below the mid-point of the tubular portion. In addition, the length of the curved slots should be provided in order to maintain the structural integrity requirements of the distributor 21.

Figure 9:
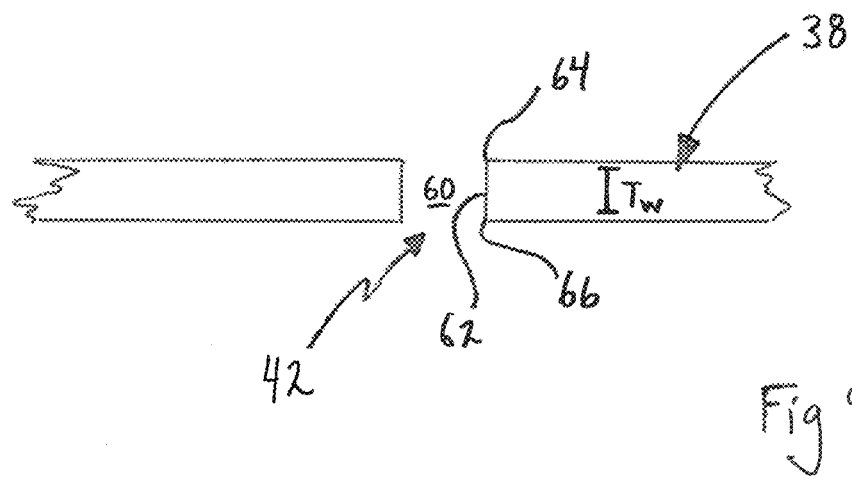
FIG. 9 is a side cross-sectional view of an example slot aperture.

Referring now to FIGS. 9, 12 and 13, each slot of the distributors can have characteristics and structural features to promote desired flow and spray effects. In some implementations, the slot 42 is formed in the walls 38 of the tubular portion which has a wall thickness $T_W$. The slots 42 thus have a throat 60 being defined by throat walls 62 that have throat wall length $L_S$ substantially corresponding to $T_W$ (as in FIG. 13) or a throat wall length $L_S$ slightly greater than $T_W$ (as in FIG. 12). The slots 42 also have a downstream edge 64 and an upstream edge 66. The slots 42 can be manufactured and designed such that the edges 64,66 and the throat walls 62 do not promote flashing within the throat 60 but only once expelled beyond the downstream edge 64. For instance, the throat can have a tapered shape where the outlet is wider than the inlet, as illustrated in FIG. 13 for example. In addition, the upstream edge 66 (also referred to the "leading edge") can be smooth and the downstream edge 64 (also referred to as the "trailing edge") can be sharp, as generally illustrated in FIG. 14. The upstream edge 66 can be bevelled or chamfered, which can help to maintain a more consistent pressure drop across the aperture over the lifetime of the distributor. Otherwise, the pressure drop can change over time as the leading edge experiences wear and changes shape and smoothness, which can reduce overall performance or efficiency of the process. Providing a bevelled or chamfered leading edge can be particularly useful in high-wear environments, which can be encountered with solids-containing feed streams such as tailings.

Referring to FIGS. 9, 12 and 13, the slots can thus be provided to inhibit cavitation within the throat 60 to promote flash atomization once expelled beyond the downstream edge 64 under the corresponding process conditions. The throat walls 62 can also be designed to minimize surface imperfections or roughness that would promote cavitation, and thus imperfections derived from manufacturing (e.g., forming the slots as cut-outs from a metallic pipe) can be smoothed away or eliminated by additional treatments.

For applications where the feed material includes solids, as is the case for solvent diluted tailings, it is possible that the solids passing through the slot could act as nucleation sites increasing the risk of pre-flashing within the throat. In situations where solids-induced nucleation is a factor, the distributors can be designed and operated by overdesigning against pre-flashing, which may include providing higher backpressure to increase subcooling (e.g., 100 kPa to 150 kPa above flashing), providing smoother slot surfaces, limiting boundary layer segregation, and so on. The extent of solids-induced nucleation can also be determined via empirical or modelling methods, and the process can be adapted in order to reduce or prevent solids-induced nucleation.

In some implementations, the throat walls 62 can be substantially straight and parallel to each other to form a throat 60 that has a constant cross-section in the outlet flow direction rather than a tapered shape. However, various shapes and configurations of the throat are also possible.

In some implementations, the wall thickness $T_w$ of the entire tubular portion is the same. The wall thickness $T_w$ of the tubular portion can also be thick enough to facilitate manufacturing of cut-out slots, to provide desired geometries for the throat and sharp edges, as well as to facilitate structural integrity of the overall distributor and of local regions such as the sections separating adjacent slots.

Referring to FIG. 3, the slots, the rounded end cap, and the spacing between various components of the distributor can have certain geometries. For example, the spacing between the adjacent slots can be between 1.5 inches and 2.5 inches or between 1.75 inches and 2.25 inches; the slots can have a generally rectangular cross-section; the width of each slot can be between about 0.75 inch and 1.25 inches or between 0.9 inch and 1.1 inches; the curvilinear length of each slot can be between 6 inches and 10 inches, or between 8 inches and 9 inches; the distance between the farthest slot and the near vessel wall is between 40 inches and 65 inches; and the distance between the beginning of the end cap and the last slot is between 3 and 7 inches or between 5 and 6 inches. In some implementations, the slots follow the curvature of the tubular portion, and extend along about 20% to about 50%, or about 35% to about 45%, of the circumference of the tubular portion. Such slot sizes and configurations can be particularly useful when the distributors are provided in an upper portion of the flashing chamber so that the tailings spray is directed downward.

Referring now to FIGS. 12 and 13, the slots can be formed as cut-outs in a metal pipe. The cut-outs can be provided using various techniques and can be done to provide a throat 60 having different geometries that can have an impact on spray characteristics. Due to the curved geometry of the pipe, a cut-out method that provides opposing throat walls 62 that are parallel to each other, as illustrated in FIG. 12, will lead to a throat wall length $L_S$ that is longer than the pipe wall thickness $T_W$. Similarly, a cut-out method that makes the cuts that perpendicular to the tangent of the pipe wall will lead to a throat wall length $L_S$ that is the same as the pipe wall thickness $T_W$ and will also result in a throat that is tapered outward, as illustrated in FIG. 13. The angles of the upstream and downstream edges will also be different depending on the cut-out angle. In FIG. 13 the edge angles would be 90°, whereas in FIG. 12 the upstream edge angles would be obtuse and the downstream edge angles would be acute. In some implementations, a non-tapering slot configuration, such as that illustrated in FIG. 12, is provided to reduce risks of pre-flashing in the throat.

It should be noted that the TSRU implementations illustrated in FIGS. 1, 7a to 7c, and 9 show the distributors located in an upper portion of the flashing chamber. In this top-of-vessel position, the distributors can be designed to spray downward and the slots can be sized and configured to minimize high velocity spray impacting side walls of the vessels, thereby reducing the need for costly wear-resistant structures and materials for the internal side walls.

Alternatively, the slotted distributors could be positioned in other locations within a flash separation vessel and can have other orientations. For instance, the distributors could be located near the bottom of the flash vessel and the slots would thus be oriented upward to enable an upward spray with provisions to avoid solid accumulation and plugging within the distributors (e.g., due to settling). The distributors could be positioned in the middle of the flash vessel and the slots would thus be oriented in the appropriate manner. In addition, the slotted distributor location within the flashing chamber can depend on the overall vessel sizing and design. For example, if the slotted distributors have a wider spray radius and the sprayed tailings have higher velocities, the vessel walls that would be impacted by high velocity spray can be reinforced at impacted locations (e.g., using thicker walls or reinforcement plates, impact-resistant structures, wear-resistant materials, etc.). In addition, for wider high velocity sprays, the vessel diameter can be designed so as to be sufficiently large to reduce the risk of impacting the side walls.

Furthermore, the location and design of the distributors and vessel can be influenced by the composition of the feed material. For feed material that includes abrasive solid particles that can cause erosion of the distributors and vessel internals at high velocities, the design can minimize impact of the spray on the internal side walls or provide reinforcement at impact locations. For feed material in which the solids are not abrasive, high velocity impact against the sides walls may not be a predominant design consideration and thus the slotted distributors could be positioned at various locations within the flashing chamber. The slotted distributors can also be positioned and configured based on the internal structure of the separation vessel (e.g., side walls location and geometry, instrumentation, bottom slurry pool depth, etc.)

In addition, the location and design of the distributors can also be influenced by design and operational features of the TSRU. For instance, for a TSRU that includes multiple trains (i.e., where multiple vessels operate in parallel), each of the separation vessels can be sized smaller for a given throughput of feed material compared to a corresponding single train. For smaller separation vessels, the distributors may have a location within the vessels and slot configuration adapted to minimize impacting the side walls which would be closer together. Thus, for a TSRU that has three trains with two stages in each train, the distributors can be positioned and configured differently compared to a single train with two stages which would have notably larger vessel size.

Thus, the location of the distributors, orientation and size of the slots, structural features of the vessel, and the operation of the unit can be coordinated in a number of ways to enhance performance and respond to operational challenges for the feed material of interest.

In some implementations, the distributors are configured and the process is operated to enable choked flow through the slots. Thus, the total size of open area of the slots and the operating conditions (e.g., temperature, pressures, composition of feed stream) can be provided to achieve choked flow for both first stage and second stage separation vessels.

The distributors can be manufactured from various materials and according to different methods. In some implementations, the distributor can be manufactured from a metallic tubular pipe or blank in which cut-outs are provided to form the slots and the rounded end cap is formed by machine-milling or a similar technique. The entire distributor may have an integral one-piece structure, which facilitates providing smooth and continuous internal surfaces of the distributor as well as structural properties. Alternatively, the distributor can be made of components that are mechanically and/or chemically attached together. The distributors can also include a coating layer provided to protect against erosion, and the type of coatings may vary depending on location as well, for example based on the amount of turbulent fluid flow within the distributor at certain locations.

In some implementations, the slotted distributor design mitigates concentrated "jets" discharged from the slots and mitigates high velocity regions within the distributor. The distributor also facilitates handling of solvent diluted tailings streams with variable compositions, such as 25 wt % to 30 wt % solids and 5 wt % to 20 wt % solvent. The distributor can be used in both the first and second stage separation vessels, which handle different feed compositions at different operating conditions.

Additional TSRU Implementations

The distributor designs described herein can be used in TSRUs with various different configurations and operational features, some of which will be described below.

Referring back to FIG. 1, the TSRU 10 can be configured as a two-stage unit with first and second stage separation vessels 14,16 operated in series. Alternatively, the TSRU can have a single stage that consists of a single separation vessel that is sized, designed and operated to achieve the desired solvent recovery. In addition, the TSRU can have more than two stages operated in series, where at least part of the underflow of each separation vessel is supplied to a subsequent separation vessel. It should also be noted that the TSRU can have multiple trains that are fully or partially operated in parallel to each other. For example, the TSRU may have a first train consisting of first and second separation vessels as illustrated in FIG. 1, and a second train that is substantially similar to the first train and operated in parallel. The first and second TSRU trains can receive solvent diluted tailings from a single FSU or from corresponding first and second FSU trains. In the case of multiple TSRU trains, it should be noted that there may be various interconnecting streams from one train to the other, for various purposes including recycling or redistributing material during periods of lower flow rates.

In some implementations, the TSRU can have two separation vessels that can operate in different modes. In one mode, only one of the separation vessels is operational and thus the TSRU operates as a single stage unit, which can be useful for repair or maintenance of the offline separation vessel and/or for periods of lower flow rates. Both of the separation vessels can thus be designed so that either one of the vessels can operate alone. In another mode, both units are operational in series to provide a two-stage unit as shown in FIG. 1. In a further mode, the order of the two separation vessels can be reversed, such that the first stage separation vessel becomes the second stage vessel and the second stage vessel becomes the first stage vessel. Such operating modes are facilitated by the use of the distributor that has a design enabling interchangeable use in both first and second stages.

In some implementations, one or more of the separation vessels of the TSRU can be configured to be free of internals and thus provide a generally open volume for the tailings material to pass through. Alternatively, one or more of the separation vessels of the TSRU can be configured to include additional features, such as internals (e.g., shed decks) that are provided within part of the flashing chamber in spaced relation below the distributors, in which case high velocity spray can be reduced prior to impacting the internals. One or more of the separation vessels can include a steam inlet for providing steam into the flashing chamber in order to aid stripping of solvent from the descending tailings within the flashing chamber. One or more of the separation vessels can also include a conical bottom section to facilitate handling of the underflow. One or more of the separation vessels can further include recirculation lines for recirculate part of the underflow back into the bottom section of the separation vessel to promote agitation and increase effective residence time. One or more of the separation vessels can also include recycle lines to recycle part of the underflow back into the feed stream to maintain constant flow rate of the feed which may be particularly beneficial during periods of lower flow rate of incoming solvent diluted tailings.

Multiphase Stream Separation Implementations

As described above, the distributor designs can be used in a single-stage or multi-stage TSRU for recovering solvent from solvent diluted tailings, which may be derived from an FSU in an oil sands secondary extraction operation. It should also be noted that the distributor designs and associated separation methods can be implemented for other multi-phase feed streams that include a volatile component and a liquid or slurry component for flashing and separation the volatile component.

In some implementations, the multiphase feed stream is derived from heavy hydrocarbon or bitumen extraction operations, from mining and/or in situ recovery processes. The multiphase feed stream can include hydrocarbon solvent as the volatile component and an aqueous slurry as the low-volatility component. The aqueous slurry can include water, mineral solids, as well as residual bitumen or heavy hydrocarbons. Such multiphase feed streams can be tailings streams or other streams derived from extraction operations using hydrocarbon solvent. The volatile solvent component can be a paraffinic solvent, an aromatic solvent, a naphthenic solvent, or another type of solvent, or a mixture of hydrocarbon solvents, where the solvent is more volatile than the aqueous slurry component. In some implementations, the volatile component and the liquid/slurry component have a vapor pressure difference similar to or greater than the vapour pressure difference between water and a $C_4$ to $C_8$ alkane.

In some implementations, the multiphase feed stream includes a low-volatility slurry component that includes erosive material, such as mineral solids, and the separation process is operated to inhibit pre-flashing of the volatile component within the distributor. In other implementations, the low-volatility component can be a liquid that is substantially free of solids. Nevertheless, distributor designs and separation processes described herein can be particularly beneficial for multiphase streams that include a liquid phase, a solid phase, and a volatile component that is flashed upon exiting the distributor and then separated as a gas stream.

Bitumen Production from Bitumen Froth

Figure 16:
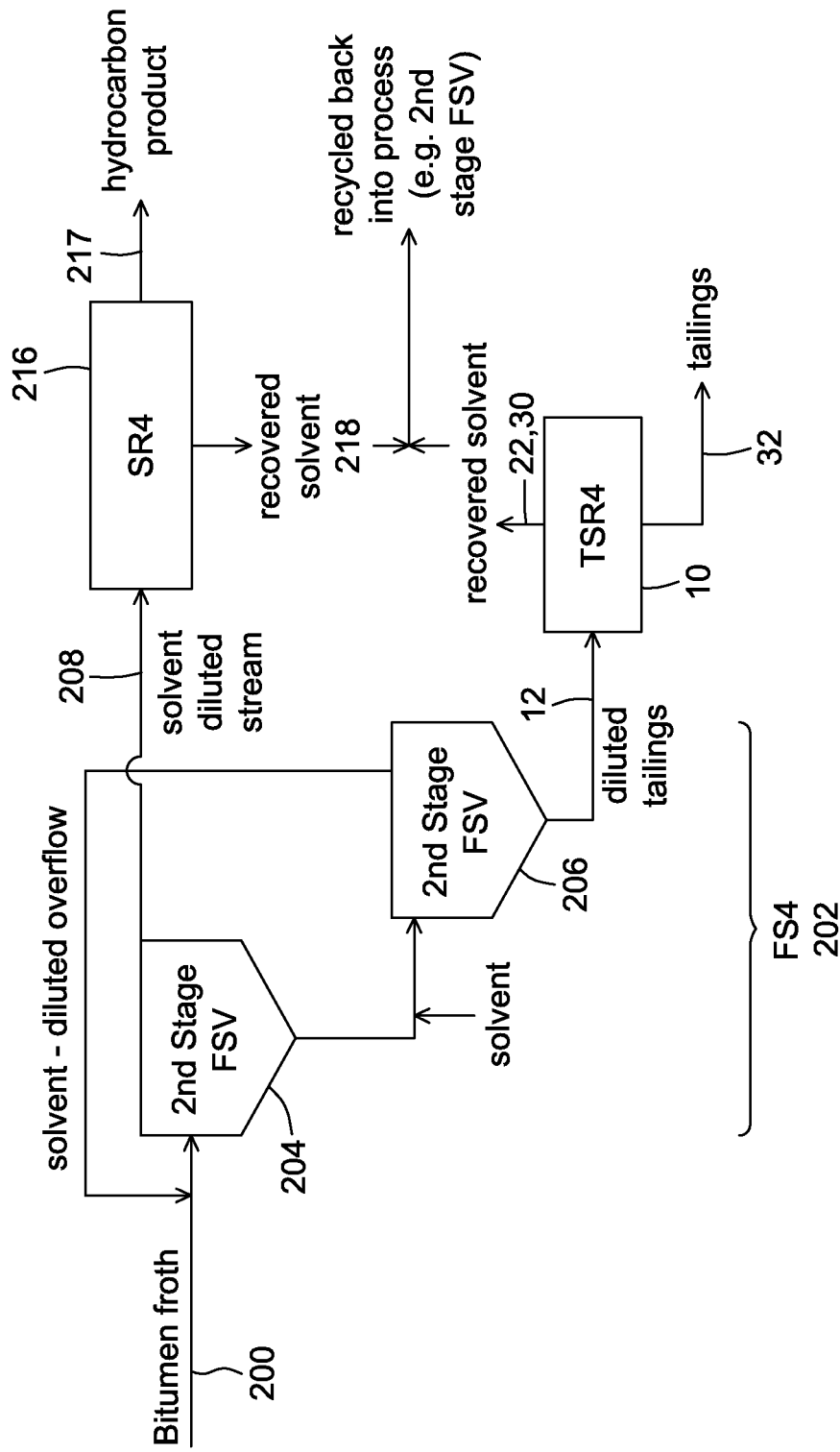
FIG. 16 is a process flow diagram for the production of a hydrocarbon product.

Referring now to FIG. 16, an overall process of treating bitumen froth to produce a hydrocarbon product is illustrated. The bitumen froth 200, which can come from a primary separation vessel (PSV) of an oil sands processing operation, can be fed to a froth separation unit (FSU) 202 which can include first and second stage froth separation vessels (FSV) 204, 206. Solvent can be added to facilitate separation. The solvent can be paraffinic or naphthenic. When paraffinic solvent is used, the solvent to bitumen ratio can be such that asphaltene flocs form and precipitate in the FSU, thereby producing a partially upgrading solvent diluted stream 208. Diluted tailings 12 are formed by the FSU 202, and that stream is sent to the TSRU 10, which can have various features as described herein, to recover solvent 22,30 and produce a solvent depleted tailings 32. The solvent diluted stream 208 from the overflow of the first stage separation vessel 204 can be used as at least part of the feed for the SRU 216. The SRU produces a hydrocarbon (e.g., bitumen) product 217 and recovered solvent 218. The recovered solvent streams 218,22,30 can be recycled back into the FSU 202, e.g., as part of the main solvent fed into the underflow of the first stage FSV 204. It should be noted that various process configurations can be used to product the hydrocarbon product from bitumen froth or a similar emulsion. For example, the FSU can include two or three vessels, which can be arranged in a counter-current configuration, with solvent addition at various locations, and the TSRU can also include one or more vessels operated using various approaches. The bitumen froth 200 can be derived from surface mining, in situ recovery operations, and/or other bitumen sources.

Experimentation & Modeling

Investigations to identify and assess advantageous distributor features employed modeling and simulation techniques. Computational Fluid Dynamic (CFD) modeling was conducted for several distributor designs and geometries to assess pre-orifice and post-orifice flows in first and second stage flash vessels.

Ternary Mixture Modeling

Modeling work was conducted to refine and verify thermodynamic curve fitting functions (e.g., critical velocity versus void fraction); to verify choking velocity for a steam-water-solids system (e.g., choking velocity versus mass fraction of steam for 30 wt % solids, at different pressures); and to confirm assumptions regarding equilibrium temperatures using HYSIS™. Results of the ternary mixture modeling were used in the modeling of the distributor designs.

Modeling of Distributor Designs

Comparative modeling work was conducted to assess several optional slotted distributor designs (see FIGS. 5a to 5e) and a "bulbous"-type distributor having a main conduit with a relatively large bulbous discharge nose extending downward near the end of the main conduit.

The "bulbous"-type distributor showed a double-step change in area with a double-step change in pressure drop (630 kPa to 440 kPa to 330 kPa to exit pressure), limiting pressure available for flow through orifice. The "bulbous"-type distributor provided a small flow area preventing desired mass flows at operating temperature and pressures. The "bulbous"-type distributor also displayed a high velocity (32 m/s) jet region at the distributor exit, and high solvent concentration at the top end of the main conduit.

Figure 10A:
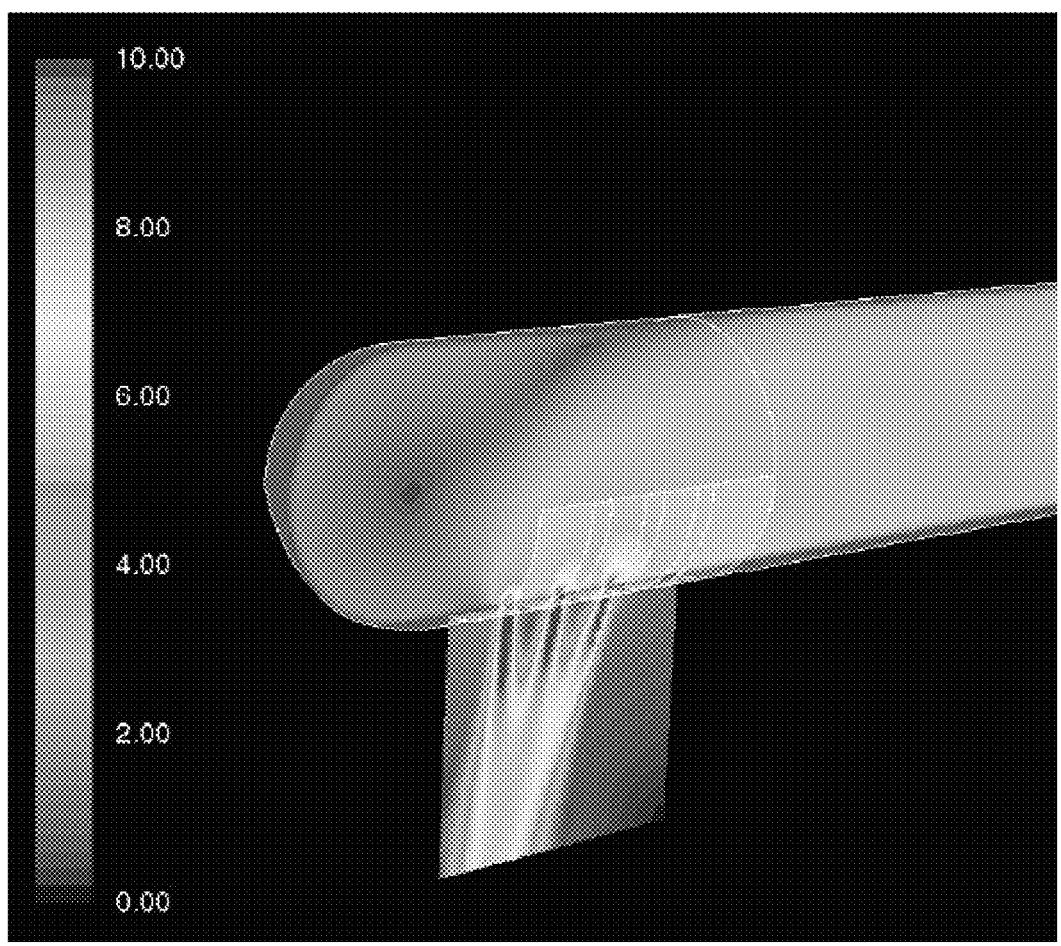
FIGS. 10a to 10c are images illustrating modelling results and respectively show velocity magnitudes, solvent volume fractions, and absolute pressure contours for an example distributor design.
Figure 10B:
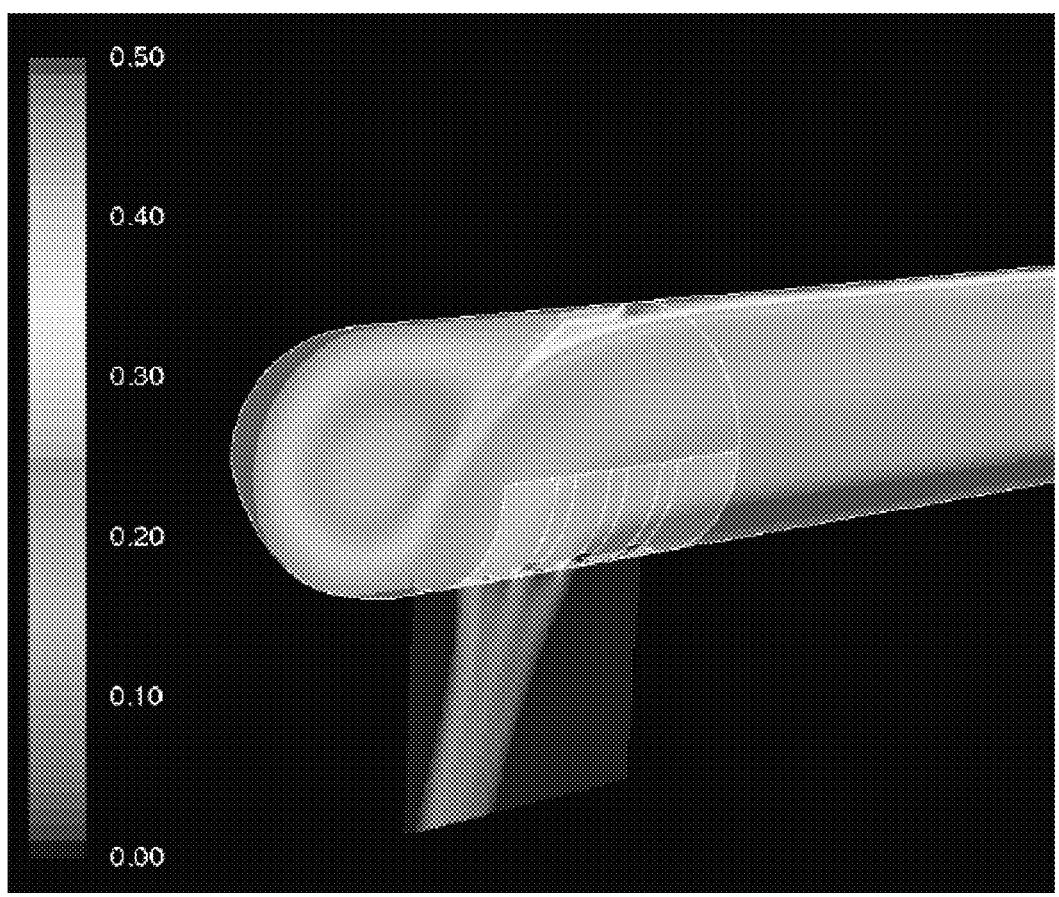
Figure 10C:
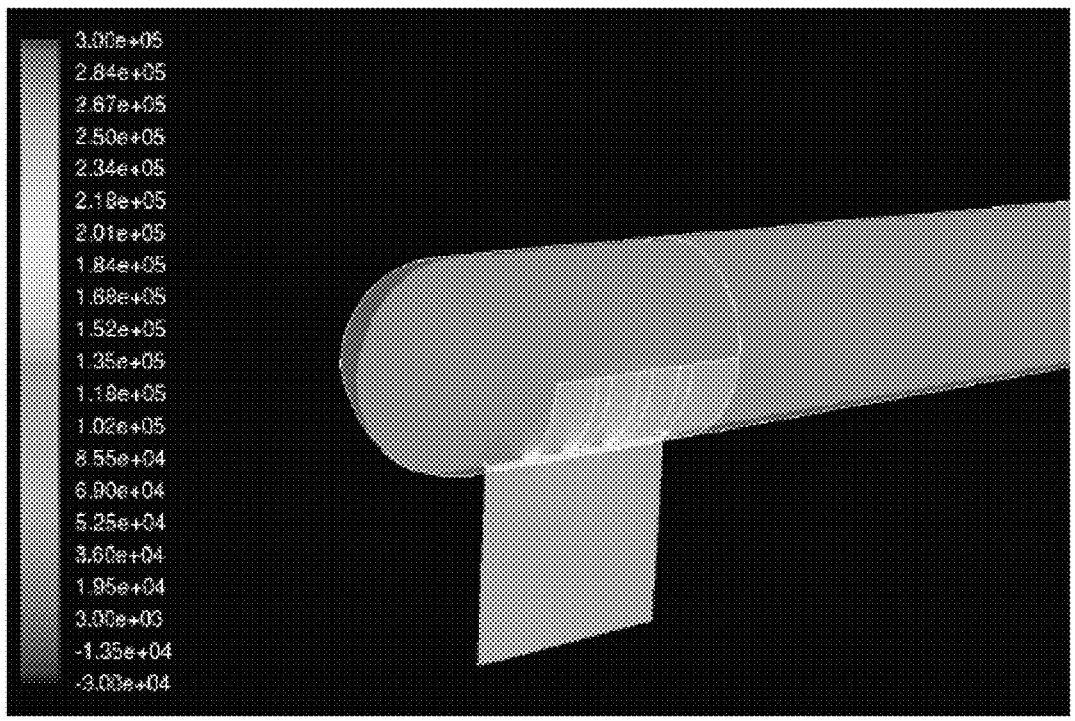

Various slotted distributor designs were modeled. Modeling results and associated findings are reported below:

FIGS. 10a to 10c respectively illustrate velocity magnitudes, solvent volume fractions, and absolute pressure contours for an example distributor design generally corresponding to the design shown in FIGS. 2, 3, 4 and 5c. For this slotted rounded-cap design, solvent mass flow was not uniformly distributed among the slots, indicating that slot areas could be refined to leverage slot flow distribution. For instance, the modeled slots received 18 wt %, 38 wt % and 44 wt % solvent for the first, second and third slot respectively. In addition, this distributor design presented reduced solvent pockets at the downstream end; less dead zones; and flows having high velocity at the slots with dissipation to 7 m/s after 1D (1 pipe diameter) from the slots.

Figure 5A:
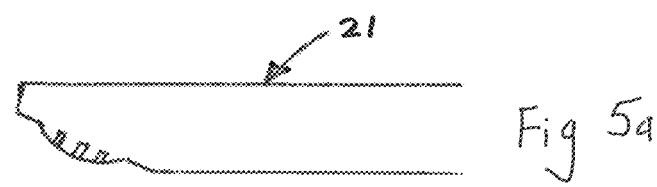
FIGS. 5a to 5e are side cross-sectional view schematics of distributor designs.
Figure 5B:
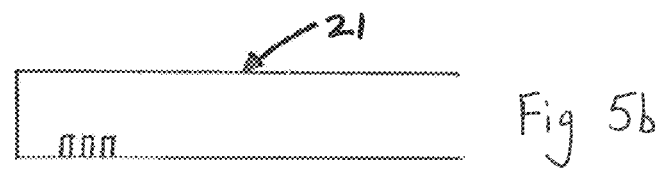
Figure 5C:
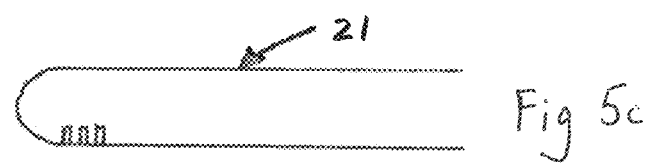
Figure 5D:
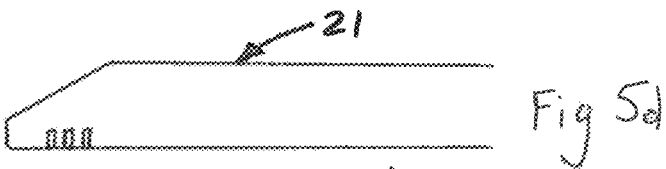
Figure 5E:
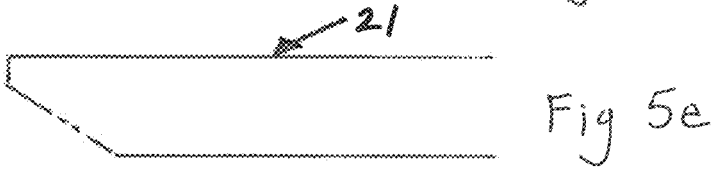
Figure 11A:
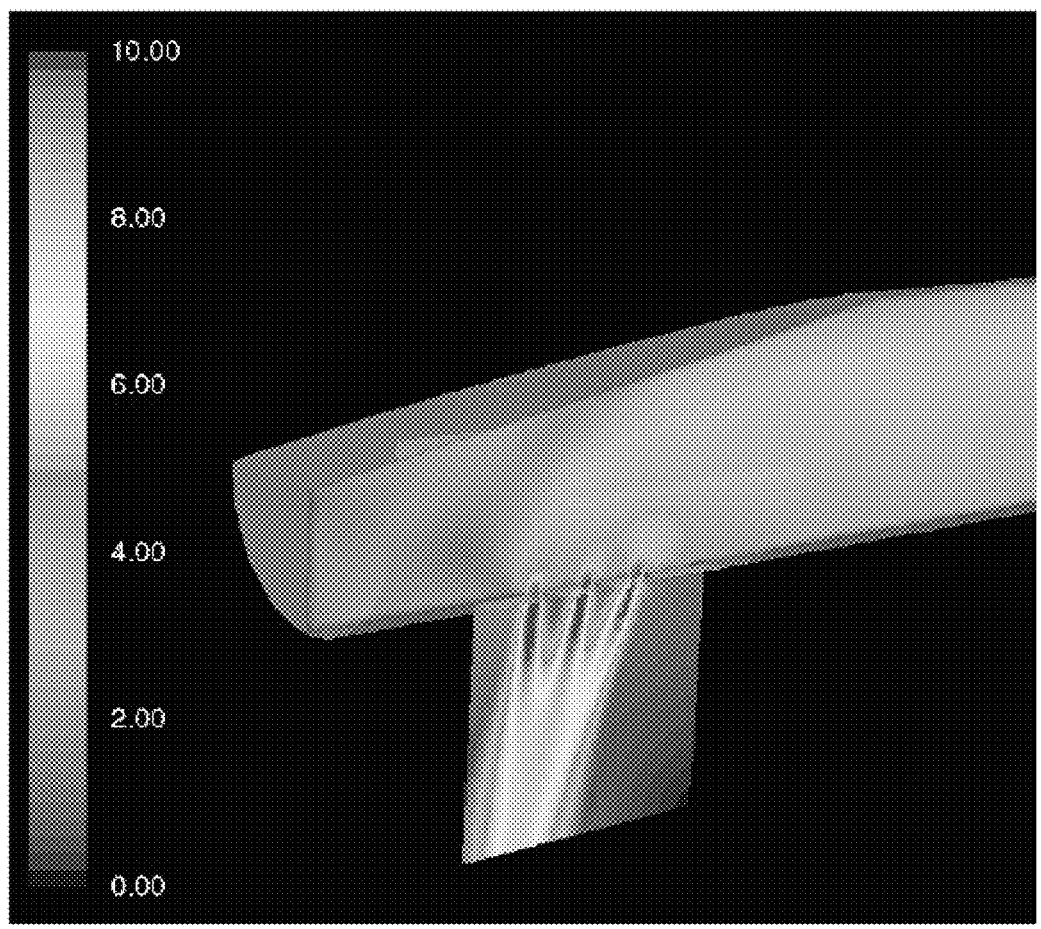
FIGS. 11a and 11b are images illustrating modelling results and respectively show velocity magnitudes and solvent volume fractions for another example distributor design.
Figure 11B:
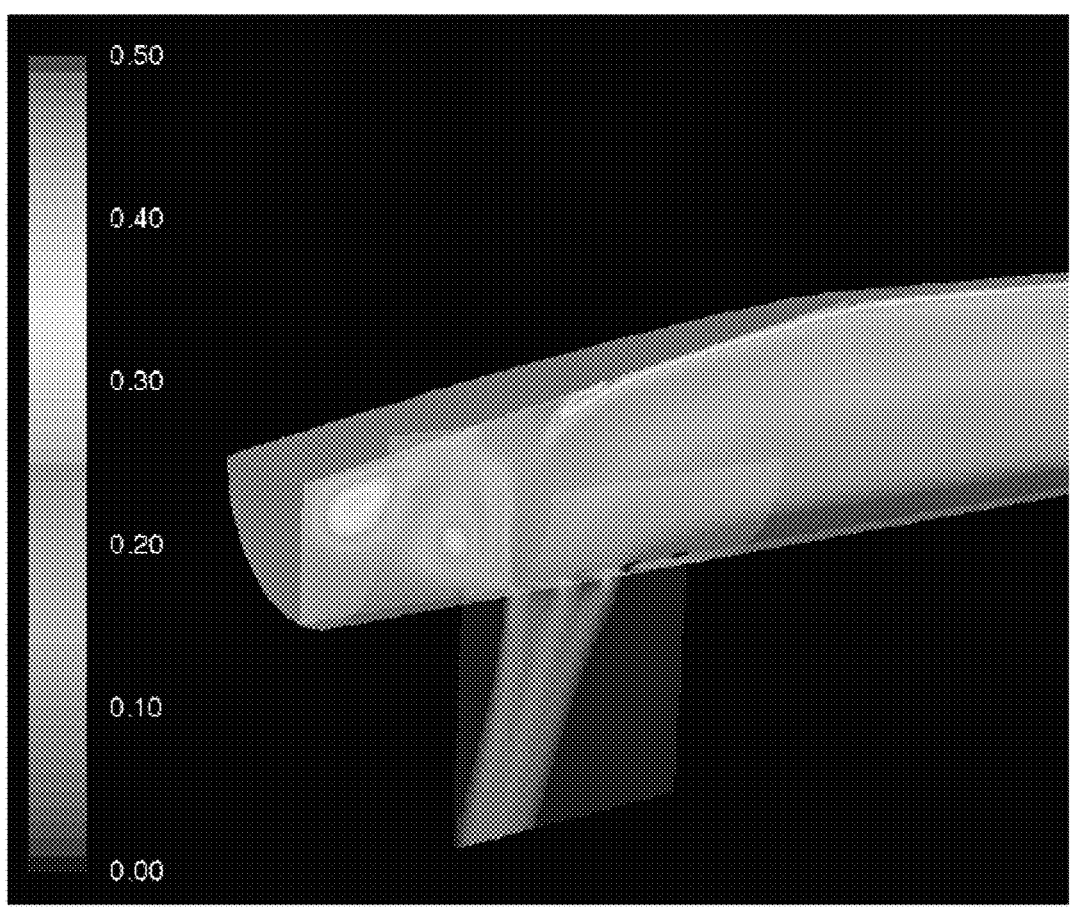

FIGS. 11a and 11b respectively illustrate velocity magnitudes and solvent volume fractions for an example distributor design generally corresponding to the design shown in FIG. 5d. For this design, velocity dissipated to 7 m/s after 1D (1 pipe diameter) from the slots. In addition, no solvent pockets were observed at the top end of the distributor, although some slugging of solvent to the slots was present.

Additional modeling was conducted to refine the features of the distributor design of FIG. 5c, particularly with respect to distributor discharge coefficient, and slot orifice size, shape and location. The discharge coefficient affects the distributor open area and thus the discharge velocity out of the distributor, and therefore was assessed in CFD and via the Omega method.

Three geometries with different total open areas were assessed (Equivalent Diameter $D_{eq}$=112 mm, 122 mm and 130 mm). The results indicated no significant change in solvent volume fraction contours, and that the maximum velocity through the slots increased as the open area decreased with the jet sheets coalescing shortly after the slots.

The spacing between the slots was also varied by a factor of two for comparison. The results indicated that there was no change on the upstream flow within the distributor, and there was weaker interaction between the jet sheets for the increased slot spacing.

Sharp-edge and thick-edge slot orifice flows and their discharge coefficients were also assessed. The thick-edge design did not present significant difference in terms of the jet interaction, but the discharge coefficient for the thick-edge was higher compared to the sharp-edge orifice for all slots (about 0.04 to 0.07 higher depending on the slot). In addition, a sharp-edge more precisely defined the discharge coefficient and thus can provide more confidence in the discharge coefficient of the as-manufactured distributor.

Iso-surfaces of pressure for pentane saturation properties were also assessed and confirmed no pre-flashing upstream of the slots for the various slotted distributor designs.

Comments on Modeling Approach

The modeling approach to assess distributor design features included the following:

(i) Estimation of the required distributor opening size for pre-flashing mitigation was based on modified Homogeneous Equilibrium Model (also referred to as HEM) for sizing safety valves for two-phase liquid/vapor relief, using the first stage separation vessel operating conditions for an example TSRU.

Figure 15A:
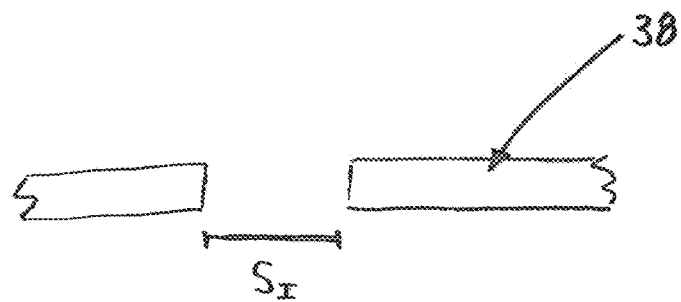
FIGS. 15a to 15d are side cross-sectional views of example slot apertures with possible overlay plate with perforations to temporarily reduce effective aperture sizes.
Figure 15B:
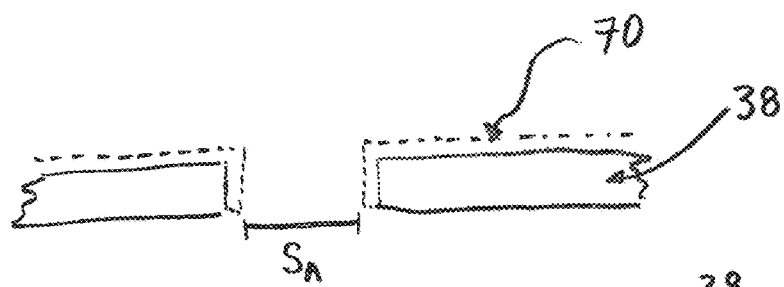
Figure 15C:
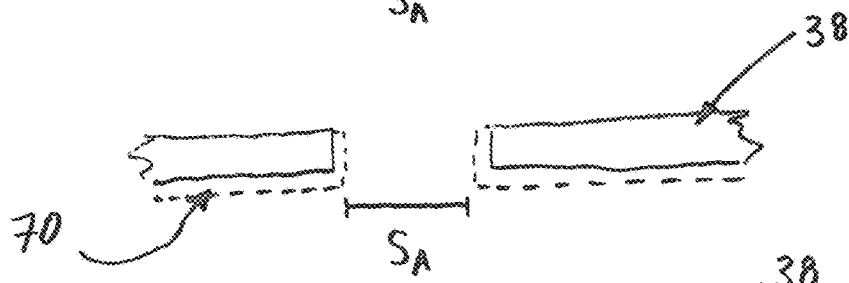
Figure 15D:
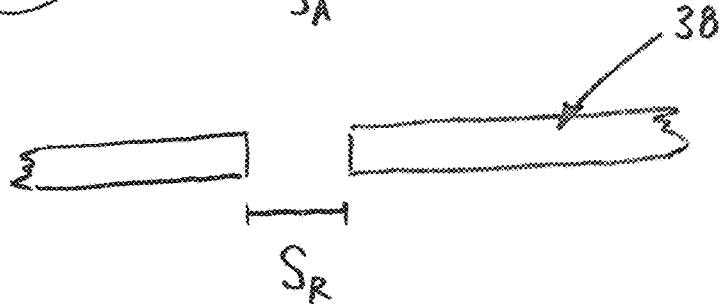

(ii) Estimation method for distributor opening size was performed to ensure over-estimation of the aperture size. By over-estimating the opening size, the initial distributors that are constructed and installed in the TSRU can be advantageously assessed during field operation and are sure to not require larger open areas which would be difficult to do (re-drilling or cutting larger apertures would be very difficult due to the mechanical properties of the distributor materials which are designed to handle erosive and high pressure conditions). For example, initial "over-designed" distributors can be installed and operated such that any pre-flashing due to the opening size is avoided by modifying one or more process parameters, such as recirculating underflow back into the feed stream and/or adding cold or hot liquid (e.g., water) into the fee stream to effectively increase the pressure drop across the apertures. The TSRU can be operated in this manner until the initial distributors are replaced with re-designed distributors with smaller opening size based on the empirical data of the operating TSRU. Another example of operating the initial over-designed distributors is to equip the distributors with an overlay plate 70, as illustrated in FIGS. 15a to 15d, or another type of size-reducing element. The plate 70 can be rapidly manufactured to have openings that align with the apertures of the distributor in order to reduce the effective size of the throat through which the fluid passes. For example, for an over-designed distributor with an opening size of $S_I$ (FIG. 15a), an overlay plate 70 can be inserted such that the adjusted opening size is $S_A$ (FIG. 15b or 15c). Once the over-designed distributor is due for replacement or the TSRU requires maintenance, a re-designed distributor can be installed with an adjusted opening size $S_R$ that is smaller than $S_I$. $S_R$ can be provided to eliminate or reduce the need for an overlay plate 70 and/or for certain process adjustments like recirculation or increasing pressure drop across the apertures. It should also be noted that a further re-designed distributors could be used in subsequent replacements depending on additional empirical data obtained from operation of the TSRU and/or planned changes to operating parameters. The HEM was an example of a modelling tool that facilitates over-estimating the initial opening size for the distributors.

(iii) Evaluation of the distributor geometries for flow field optimization by modelling the flow in two parts using computational fluid dynamics (CFD). The CFD models were provided such that the results bracketed the process design conditions. The two modelling parts were:
(a) Pre-orifice modelling (first stage separation vessel), using CFD models to evaluate the multiphase flow distribution approaching the distributor prior to any liquid flashing to vapour, and (b) post-orifice modelling (second stage separation vessel), using CFD models to evaluate the multiphase flow distribution leaving the distributor after flashing has occurred.

It should be noted that modeling assumptions can be tailored for the given distributor application and multiphase stream to be processed. For example, for a TSRU that receives a feed stream from an FSU in which paraffinic solvent was used, the pre-orifice conditions can assume that a certain percentage of the solvent (e.g., 5 wt %) is bound in precipitated aggregates and is therefore included in the slurry phase while the remaining solvent is free, and post-orifice conditions can be based on all bound and free solvent flashing to vapour.

Comments on Modeling Findings

It was found that it is advantageous to avoid a step change in area between the lance and the distributor openings, and that the distributor apertures can thus be designed as slots (e.g., rectangular cut-outs) from a pipe of equal diameter to that of the lance in order to generally eliminate a step change in area prior to the slot openings themselves.

In addition, it was found that a slotted geometry can provide a thin sheet-like distributor flow, which can dissipate more readily than a circular jet of the same flow conditions, and thus avoiding circular distributor apertures can be advantageous.

The invention claimed is:

1. A process for producing a bitumen product from bitumen froth, comprising:
adding a solvent to the bitumen froth to produce a solvent diluted froth;
separating the solvent diluted froth to produce a solvent diluted bitumen component and solvent diluted tailings;
recovering solvent from the solvent diluted tailings, wherein the recovering comprises:
introducing the solvent diluted tailings to a flashing chamber of a flash vessel through a distributor extending within the flashing chamber, the distributor comprising:
a tubular portion comprising:
a cylindrical wall defining a feed conduit for receiving the solvent diluted tailings; and
multiple spaced-apart pressure let-down slots provided through the cylindrical wall and spaced apart along a length thereof, the pressure let-down slots having a transverse orientation with respect to a longitudinal axis of the tubular portion and providing fluid communication between the feed conduit and the flashing chamber for introducing the solvent diluted tailings into the flashing chamber; and
a closed end portion connected to a downstream extremity of the tubular portion;
recovering flashed solvent from the flashing chamber as a solvent overhead stream; and
recovering a solvent depleted tailings component from the flashing chamber as an underflow stream; and
reusing the recovered solvent in the process;
recovering solvent from the solvent diluted bitumen component to produce a recovered solvent stream and a bitumen product.

2. The process of claim 1, wherein the tubular portion extends from a side wall of the flash vessel into the flashing chamber, has a substantially horizontal orientation within the flashing chamber, and is substantially linear within the flashing chamber.

3. The process of claim 2, wherein the tubular portion is configured such that the feed conduit has a substantially constant diameter along a length thereof.

4. The process of claim 1, wherein the tubular portion is a pipe section and the pressure let-down slots are rectangular cut-outs in the cylindrical wall of the pipe.

5. The process of claim 1, wherein multiple distributors are used in the flashing chamber.

6. The process of claim 1, wherein the pressure let-down slots are provided along a common side of the tubular portion.

7. The process of claim 6, wherein the pressure let-down slots are positioned on a bottom part of the tubular portion to introduce the solvent diluted tailings downwardly into the flashing chamber.

8. The process of claim 1, wherein the pressure let-down slots each extend along about 20% to about 50% of the circumference of the tubular portion.

9. The process of claim 1, wherein the pressure let-down slots comprise at least three pressure let-down slots that are clustered together proximate to the closed end portion.

10. The process of claim 1, wherein the pressure let-down slots each comprise a throat defined by throat walls, an upstream edge, a downstream edge, an inlet, and an outlet, wherein the throat walls include smooth surfaces to inhibit cavitation within the throat or the upstream edge is smooth-edged to inhibit cavitation within the throat.

11. A process for producing a bitumen product from bitumen froth, comprising:
adding a solvent to the bitumen froth to produce a solvent diluted froth;
separating the solvent diluted froth to produce a solvent diluted bitumen component and solvent diluted tailings;
recovering solvent from the solvent diluted tailings, wherein the recovering comprises:
introducing the solvent diluted tailings to a flashing chamber through a distributor extending within the flashing chamber, the distributor comprising:
a tubular portion extending into the flashing chamber, the tubular portion comprising:
a tubular wall defining a feed conduit for receiving the multiphase stream; and
multiple spaced-apart pressure let-down apertures provided through the tubular wall and spaced apart along a length thereof, the pressure let-down apertures providing fluid communication between the feed conduit and the flashing chamber for introducing the multiphase stream into the flashing chamber; and
a closed end portion connected to a downstream extremity of the tubular portion, the closed end portion comprising tapered walls defining a flow redirection zone to redirect a bypassed portion of the multiphase stream back toward the pressure let-down apertures;
recovering flashed solvent from the flashing chamber as a solvent overhead stream; and
recovering a solvent depleted tailings component from the flashing chamber as an underflow stream;
reusing the recovered solvent in the process; and
recovering solvent from the solvent diluted bitumen component to produce a recovered solvent stream and a bitumen product.

12. The process of claim 11, wherein the tapered walls comprise curved internal surfaces shaped to define the flow redirection zone in the shape of an ellipsoid cap having an axis generally aligned with a longitudinal axis of the tubular portion.

13. The process of claim 12, wherein the ellipsoid cap is a degenerate ellipsoidal cap.

14. The process of claim 11, wherein the curved internal surfaces are continuous and smooth.

15. The process of claim 11, wherein the closed end portion and the tubular portion have an integral one-piece structure, and the curved internal surfaces are machine-milled.

16. The process of claim 11, wherein the curved internal surfaces are substantially symmetrical about a central longitudinal axis.

17. The process of claim 11, wherein each pressure let-down aperture is shaped as a transverse slot.

18. The process of claim 11, wherein the tubular portion extends from a side wall of the flash vessel into the flashing chamber, has a substantially horizontal orientation within the flashing chamber, and is substantially linear within the flashing chamber.

19. A method for producing a bitumen product, comprising:
adding a solvent to the bitumen froth to produce a solvent diluted froth;
separating the solvent diluted froth to produce a solvent diluted bitumen component and solvent diluted tailings;
recovering solvent from the solvent diluted tailings, wherein the recovering comprises introducing the solvent diluted tailings to a flashing chamber through a distributor extending within the flashing chamber, wherein design and implementation of the distributor comprises:
providing the flashing chamber with an over-designed distributor having an over-estimated opening size based on an initial process design mode;
operating the flashing chamber in an adjusted mode compared to the initial process design mode to account for the over-estimated opening size of the over-designed distributor;
replacing the over-designed distributor with a re-designed distributor having an adjusted opening size determined based on operation of the flashing chamber in the adjusted mode with the over-designed distributor; and
operating the flashing chamber with the re-designed distributor according to the initial process design mode;
recovering flashed solvent from the flashing chamber as a solvent overhead stream; and
recovering a solvent depleted tailings component from the flashing chamber as an underflow stream; and
reusing the recovered solvent in the process;
recovering solvent from the solvent diluted bitumen component to produce a recovered solvent stream and a bitumen product.

20. The process of claim 1, wherein the cylindrical wall defines a constant diameter of the tubular portion, the tubular portion extending from a side wall of the flash vessel into the flashing chamber with a substantially horizontal orientation within the flashing chamber.

21. The process of claim 1, wherein the pressure let-down slots have a slot length between 6 inches and 10 inches.

22. The process of claim 21, wherein the pressure let-down slots have a width between about 0.75 inch and 1.25 inches.

23. The process of claim 1, wherein the tubular portion (a) is substantially cylindrical, (b) extends from a side wall of the flash vessel into the flashing chamber with a substantially horizontal orientation within the flashing chamber, and (c) is substantially linear within the flashing chamber; and wherein the pressure let-down slots (i) are rectangular cut-outs in the tubular wall, (ii) are positioned on a bottom part of the tubular portion to introduce the solvent diluted tailings downwardly into the flashing chamber, (iii) each extend along about 20% to about 50% of the circumference of the tubular portion, and (iv) comprise at least three pressure let-down slots that are clustered together proximate to the closed end portion.

24. The process of claim 10, wherein the throat comprises a tapered shape defined by the outlet being wider than the inlet.

25. The process of claim 10, wherein the upstream edge of the throat is bevelled or chamfered.

26. A process for producing a bitumen product from bitumen froth, comprising:
- adding a solvent to the bitumen froth to produce a solvent diluted froth;
- separating the solvent diluted froth to produce a solvent diluted bitumen component and solvent diluted tailings;
- recovering solvent from the solvent diluted tailings, wherein the recovering comprises:
  - introducing the solvent diluted tailings to a flashing chamber through a distributor extending within the flashing chamber, the distributor comprising:
    - a tubular portion extending into the flashing chamber, the tubular portion comprising:
      - a cylindrical wall defining a feed conduit for receiving the multiphase stream; and
      - multiple spaced-apart pressure let-down apertures provided through the cylindrical wall and spaced apart along a length thereof, the pressure let-down apertures providing fluid communication between the feed conduit and the flashing chamber for introducing the multiphase stream into the flashing chamber; and
    - a closed end portion connected to a downstream extremity of the tubular portion, the closed end portion comprising tapered walls with curved internal surfaces defining an ellipsoid cap;
  - recovering flashed solvent from the flashing chamber as a solvent overhead stream; and
  - recovering a solvent depleted tailings component from the flashing chamber as an underflow stream;
- reusing the recovered solvent in the process; and
- recovering solvent from the solvent diluted bitumen component to produce a recovered solvent stream and a bitumen product.

* * * * *